(12) United States Patent
Shiotsu et al.

(10) Patent No.: US 6,993,358 B2
(45) Date of Patent: Jan. 31, 2006

(54) COMMUNICATION MONITORING AND CONTROLLING FOR PREVENTION OF RF SIGNAL INTERFERENCE IN INFORMATION PROCESSING DEVICE HAVING PLURAL WIRELESS COMMUNICATION UNITS

(75) Inventors: Shinichi Shiotsu, Kawasaki (JP); Satoshi Kazama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 09/746,062

(22) Filed: Dec. 26, 2000

(65) Prior Publication Data

US 2001/0051530 A1    Dec. 13, 2001

(30) Foreign Application Priority Data

Jun. 1, 2000    (JP)    ............................. 2000-164438

(51) Int. Cl.
*H04B 1/38*    (2006.01)
*H04M 1/00*    (2006.01)

(52) U.S. Cl. ...................... 455/552.1; 455/9; 455/11.1; 455/553.1

(58) Field of Classification Search ............... 455/11.1, 455/9, 7, 13.4, 16, 69, 522, 552.1, 553.1, 455/445, 502, 41.1, 41.2, 550.1, 561, 3.05, 455/66.1, 67.11, 562.1

See application file for complete search history.

(56) References Cited

U.S. PATENT DOCUMENTS

| | | | | |
|---|---|---|---|---|
| 4,794,649 A | * | 12/1988 | Fujiwara | .......................... 455/9 |
| 6,141,533 A | * | 10/2000 | Wilson et al. | .............. 455/11.1 |
| 6,356,192 B1 | * | 3/2002 | Menard et al. | ......... 340/539.19 |
| 6,445,921 B1 | * | 9/2002 | Bell | ......................... 455/426.1 |
| 6,574,452 B1 | * | 6/2003 | Morvan et al. | ............. 455/11.1 |
| 6,600,727 B1 | * | 7/2003 | Mackay | ....................... 370/293 |
| 6,690,657 B1 | * | 2/2004 | Lau et al. | ..................... 370/315 |
| 2002/0107047 A1 | * | 8/2002 | Sydon et al. | ................ 455/561 |

OTHER PUBLICATIONS

Patent Abstract of Japan, Abstract of Hei 5-75484 filed Mar. 26, 1993, Japan (Abstract only).
Patent Abstract of Japan, Abstract of Hei 7-87093 filed Mar. 31, 1995, Japan (Abstract only).

* cited by examiner

*Primary Examiner*—Tilahun Gesesse
*Assistant Examiner*—John J. Lee
(74) *Attorney, Agent, or Firm*—Westerman, Hattori, Daniels & Adrian, LLP

(57) ABSTRACT

An information processing device (10) includes first (12) and second (13) wireless communication units, and a communication monitoring and controlling unit (11). When the first communication unit is communicating with another information processing device (20), the monitoring and controlling unit monitors the communication state of the second communication unit and adjusts a transmission condition of a wireless transceiver of the first communication unit based on the monitored communication state of the second communication unit. When the second communication unit establishes or maintains a connection, the transmission power of the transceiver of the first communication unit is lowered, and when the transceiver of the second communication unit neither establishes nor maintains a connection, the transmission power of the first communication unit is at a higher level.

59 Claims, 13 Drawing Sheets

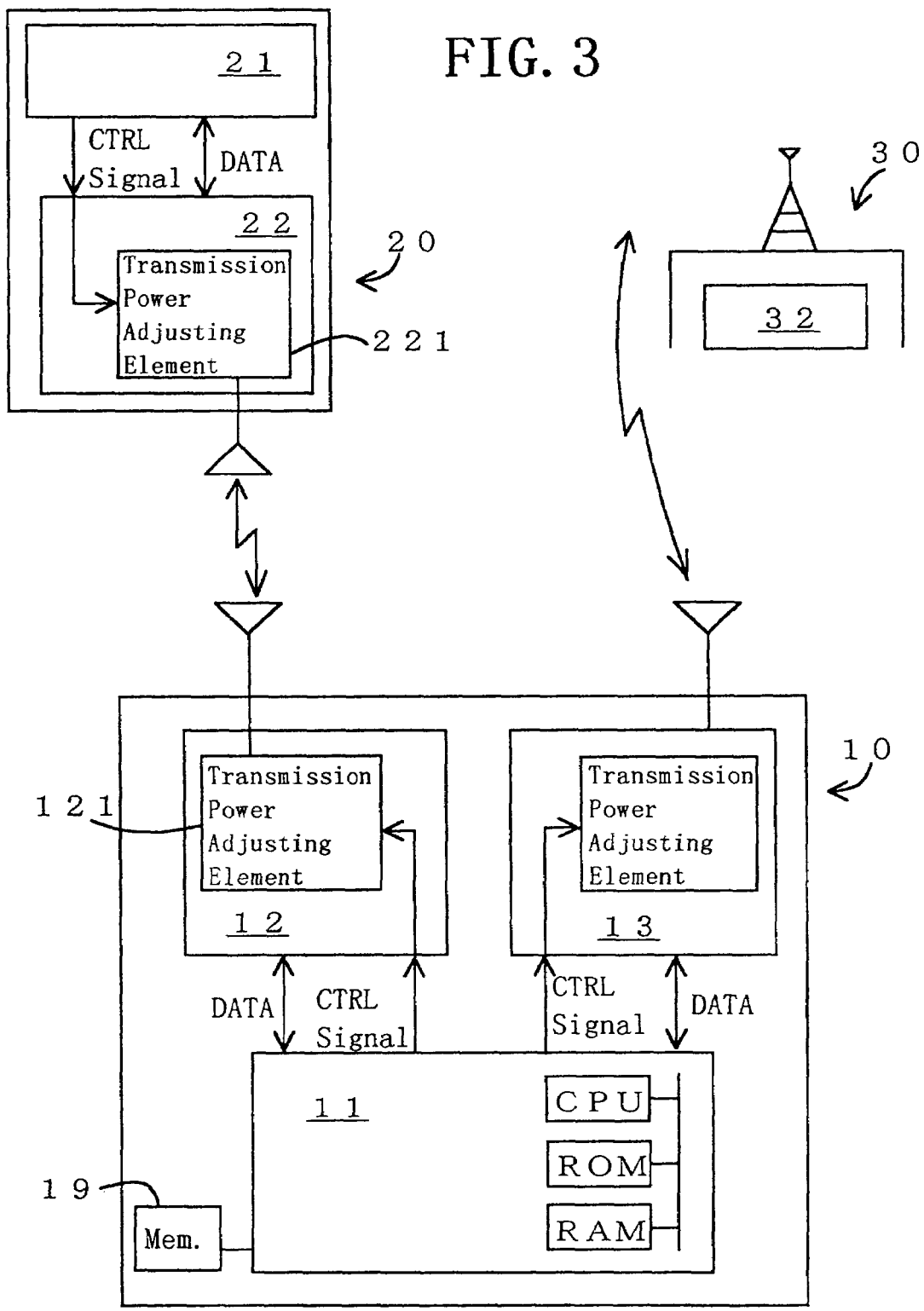

COMMUNICATION MONITORING AND CONTROLLING FOR PREVENTION OF RF SIGNAL INTERFERENCE IN INFORMATION PROCESSING DEVICE HAVING PLURAL WIRELESS COMMUNICATION UNITS

FIELD OF THE INVENTION

The present invention relates to an information processing device with wireless communication functions, and, more particularly, to an information processing device, e.g. a personal computer (PC), having built-in wireless communication units or card slots into which a wireless communication card is inserted.

BACKGROUND OF THE INVENTION

In these years, notebook-sized personal computers having a wireless communication function or transceiver function for communications with a variety of peripheral devices have been developed. Such wireless communication function replaces cables connecting the personal computer with peripheral devices or mobile devices such as personal digital assistants (PDAs). Typically, wireless communications between a personal computer and peripheral devices, such as digital cameras, scanners and printers, are performed according to a short-distance wireless communication protocol, e.g. the Bluetooth Standard. The Bluetooth is a standard for short-distance wireless communications developed by the collaboration of Ericsson, IBM, Intel, Nokia and Toshiba. The Bluetooth uses the 2.4 GHz band (2.402 GHz–2.480 GHz) called ISM (Industrial, Scientific and Medial) band. It defines three power classes, namely, Power Class 1 of 1 mW, Power Class 2 of 2.5 mW and Power Class 3 of 100 mW. Depending on the power class employed, short and middle-distance communications over from 10 m to about 100 m can be done. The Bluetooth employs the GFSK modulation and the frequency hopping. The personal computer and the peripheral devices each have one wireless transceiver.

Some personal computers have a wireless communication ability to communicate with another personal computer or information processing device via mobile communication networks for, for example, the PDC (personal digital cellular) system, the PHS (personal handyphone system) and the CDMA system, or via various networks, e.g. a wireless LAN formed according to IEEE 802.11 in which the 2.4 GHz band (2.40–2.497 GHz) is used and the direct sequence spread spectrum system (DBPSK or DQPSK) or the frequency hopping system (GFSK) is employed. Typically, a wireless LAN is used indoors, e.g. in a building or in an office room, which is suitable for high speed data transfer, and data transfer is performed outdoors via mobile communication networks, using PDC, PHS and/or CDMA mobile units. Ordinary notebook personal computers can have a single wireless transceiver in the form of a wireless card inserted into it. Such wireless transceiver is arranged to conform with one of the above-described wireless communication systems.

Shinichi lchitsubo disclosed controlling powers for data transmission between a base station and a mobile station, in Japanese Unexamined Patent Publication No. HEI 5-75484 A laid open for public inspection on Mar. 26, 1993. According to Ichitsubo, one of the base and mobile stations detects the power level of a received RF signal from the other station. The other station sends its own transmission power level modulating it on the RF signal. The one station demodulates the transmission power level sent from the other station. Using the power level of the received RF signal and the transmission power level sent from the other station, the one station computes its own transmission power level suitable for transmission and control its transmitter according to the computed suitable transmission power. The one station also sends the transmission power level on the RF signal to the other station.

In case that the base station and the mobile station operate at different frequencies, when the mobile station stops moving at a location where propagation loss is different between transmission and reception, a feedback control is performed, in which one station sends back to the other station a value by which the transmission power level at the other station should be modified. The value sent back to the other station is dependent on the power level of the RF signal received from the one station.

This transmission power control is only applicable to a system in which the mobile station has one wireless transceiver. If one wants to use this control system for controlling communications between known wireless transceivers for known various communication conditions, it is necessary to set transmission conditions for the respective cases through extra processing. Therefore this control system cannot respond quickly to changes in communication condition.

In Japanese Unexamined Patent Publication No. HEI 7-87093 A laid open for public inspection on Mar. 31, 1995 (corresponding to U.S. Ser. No. 912,527 filed on Jul. 13, 1992), Raphael Rom disclosed a process and apparatus for implementing a protocol for controlling transmitter power in a wireless LAN. In transmitter power control disclosed in this publication, a transmitter at a first node transmits, at the beginning of the protocol, its own transmitter radiation power level in a particular field in a data packet, to a receiver at a second node. The receiver at the second node determines the quality of a received signal from the transmitter radiation power level, and computes a proposed transmitter radiation power level. The receiver, then, sends back, as a feedback signal, the computed, proposed transmitter radiation power level or a value representing the received signal quality, to the transmitter at the first node, placing the feedback signal in a particular field in a data packet. The transmitter at the first node, upon receipt of the feedback signal, adjusts its transmission radiation power level according to the proposed transmitter radiation power level or received-signal quality representative value received from the receiver at the second node.

As the system proposed by Ichitsubo, if one wants to use this control system for controlling communications between known wireless transceivers for known various communication conditions, it is necessary to set transmission conditions for the respective cases through extra processing. Therefore this control system cannot respond quickly to changes in communication condition.

The inventors of the present application expect that a plurality of different wireless transceiver modules may be built in a personal computer or inserted in the form of card into a slot formed in the body of the computer, for wireless communications with another personal computer or a plurality of peripheral devices within a building or a room or for wireless communications with a network (e.g. a mobile network access point (AP) or base station, and a wireless LAN access point). In such cases, the wireless transceivers may be disposed near to each other.

The inventors also have recognized that wireless communications between a set of a personal computer and its peripheral devices and wireless communications between another set happen to take place in the same room and at the same time.

Wireless transceiver modules like the ones described above may be provided not only in notebook personal computers, but also in desktop personal computers, handheld personal computers, personal computers of other types and other information processing devices.

A plurality of wireless transceivers built in a personal computer may be located near to each other within the computer.

Information processing devices with short-distance wireless transceivers conforming with the Bluetooth may be located at respective specific distances or locations from a master personal computer.

In particularly, when a plurality of different transceivers disposed in a small-sized information processing device such as, for example, a notebook-sized personal computer are operated to communicate with other devices simultaneously, a RF signal transmitted from at least one wireless transceiver may substantially interfere with or disturb the reception of other RF signal by other wireless transceiver. Because of small dimensions of small-sized information processing devices, such as notebook personal computers, interchannel interference may not be sufficiently reduced even if antennas for a plurality of wireless transceivers associated therewith are spaced as far as possible from each other.

Also, because various devices are disposed near to each other, a RF signal from one device may interfere with a RF signal to be received by other device.

In order to provide higher reliability for communications, the reception signal power level of each device should be as high as possible within a range predetermined for that device.

A major object of the present invention is to provide an information processing device with wireless communication ability, which can avoid or sufficiently reduce, by a simple manner, inter-channel or co-channel interference which could occur when wireless communications take place between a plurality of information processing devices with wireless communication ability.

SUMMARY OF THE INVENTION

According to one aspect of the present invention, an information processing device includes a plurality of communication units each having a wireless transceiver. The information processing device includes also a communication monitoring and control unit. When at least one of the communication units of the device is connected to another unit of another device, the monitoring and control unit iteratively monitors at least one other communication unit of the information processing and controls a transmission condition or parameter of the wireless transceiver of the connected communication unit in accordance with the communication state of the monitored communication unit.

According to another aspect of the invention, the information processing device includes first and second communication units having respective wireless transceivers. The monitoring and controlling unit of the information processing device, when the first communication unit is connected to another unit of another device, iteratively monitors the first and second communication units and controls the transmission condition of the wireless transceiver of the first communication unit in accordance with the communication states of the first and second communication units and with an application activated in relation to the connection of the first communication unit or device data of another information processing device with which the subject information processing device is communicating.

According to still another aspect of the present invention, the information processing device includes at least one communication unit having a wireless transceiver. The monitoring and controlling unit of the information processing device, when the communication unit is going to be connected or is currently connected to another unit of another device, controls the transmission condition of the wireless transceiver of the communication unit in accordance with an application activated in relation to the connection of the communication unit or device data of another information processing device with which the subject information processing device is communicating.

According to a further aspect of the invention, the information processing device includes at least one communication unit having a wireless transceiver. The monitoring and controlling unit of the information processing device, when the communication unit is connected to another unit of another device, iteratively monitors the communication unit and controls the transmission condition of the wireless transceiver of the communication unit in accordance with the communication state of the monitored communication unit and with an application activated in relation to the connection of the communication unit or device data of another information processing device with which the subject information processing device is communicating.

According to still another aspect of the present invention, an information processing device includes a plurality of communication units. A communication monitoring and controlling program for use with the information processing device is stored in a recording medium, and causes a processor of the information processing device to execute a step of iteratively monitoring the communication state of at least one of the plurality of communication units, when at least another one of the communication units is connected to another unit of another device, and a step of controlling the transmission condition of the wireless transceiver of the one, connected communication unit in accordance with the communication state of the monitored communication unit.

According to a further aspect of the invention, an information processing device includes first and second communication units. A communication monitoring and controlling program for use with the information processing device is stored in a recording medium, and causes a processor of the information processing device to execute a step of iteratively monitoring the communication state of the first and second communication units when the first communication unit is connected to another unit of another device, and a step of controlling the transmission condition of a wireless transceiver of the first communication unit in accordance with the communication states of the first and second communication units and with an application activated in relation to the connection of the first communication unit or device data of the another information processing device with which the subject information processing device is communicating.

According to a still further aspect of the invention, an information processing device includes a communication unit with a wireless transceiver, and a communication monitoring and control program for use with the information processing device is stored in a recording medium. When the communication unit is going to be connected or is currently connected to another unit of another device, the program causes a processor of the information processing device to execute a step of controlling the transmission condition of the wireless transceiver of the communication unit in accordance with an application activated in relation to the connection of the communication unit or device data of another information processing device with which the subject information processing device is communicating.

According to another aspect of the invention, the information processing device includes a communication unit having a wireless transceiver, and a communication monitoring and controlling program for use with the information processing device is stored in a recording medium. When the communication unit is connected to another unit of another device, the program causes a processor of the information processing device to execute a step of iteratively monitoring the communication unit, and a step of controlling the transmission condition of the wireless transceiver of the communication unit in accordance with the communication state of the monitored communication unit and with an application activated in relation to the connection of the communication unit or device data of another information processing device with which the subject information processing device is communicating.

The present invention can avoid, by simple means, RF signal interference which would otherwise occur when an information processing device with a plurality of wireless communication functions is communicating with one or more other information processing devices each having a wireless communication function.

BRIEF DESCRIPTION OF THE DRAWINGS

FIG. 3 is a block diagram illustrating a first embodiment of the present invention.

PREFERRED EMBODIMENTS OF THE INVENTION

Figure 1:
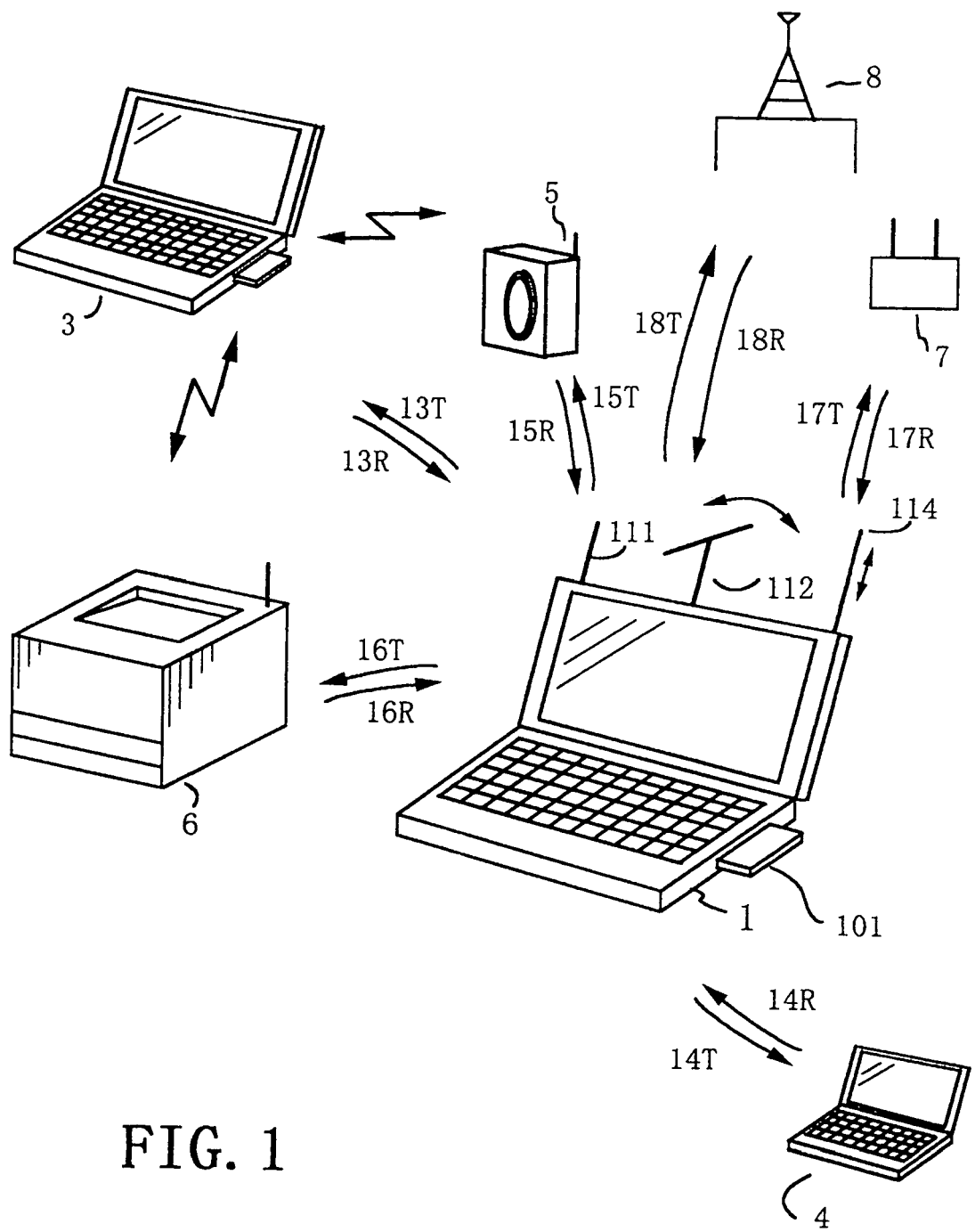
FIG. 1 shows an arrangement of plural information processing devices having different wireless communication functions, for use in explaining the present invention.

FIG. 1 shows how a plurality of information processing devices with different wireless communication functions in which the present invention can be embodied may be arranged. A personal computer (PC) 1 includes a plurality of wireless communication apparatuses or transceivers for communication with a plurality of other information processing devices. The wireless transceivers are in the form of built-in module and respectively connected to antennas 111, 112 and 114. One or more of the transceivers may be in the form of a wireless card 101, which can be inserted into a slot formed in a body of the personal computer 1. The personal computer 1 can transfer data to and from a peripheral device having a similar wireless communication unit, e.g. a digital camera (DC) 5, a facsimile machine (FAX) or a printer (PR) 6, via wireless modules or cards based on the Bluetooth Standard. The personal computer 1 may also transfer data to and from an information processing device with a similar wireless communication unit, e.g. an electronic note (PDA) 4 or another personal computer 3 via the Bluetooth wireless modules or cards. Also, it may make data transfer to and from a wireless LAN access point (AP) 7 via a wireless LAN card or module. Further, it may send and receive data to and from a mobile communication network access point 8 via a personal digital cellular (PDC), a personal handyphone system (PHS) or CDMA module or card conforming to a mobile station standard. Such data transfer is performed according to predetermined protocols.

The personal computer 1 shown in FIG. 1 is a notebook personal computer, but it may be a desktop-type personal computer, a handheld personal computer or any other information processing device. Also, the peripheral devices 5 and 6 and the information processing devices 3 and 4 may be provided with plural wireless communication units.

Figure 2A:
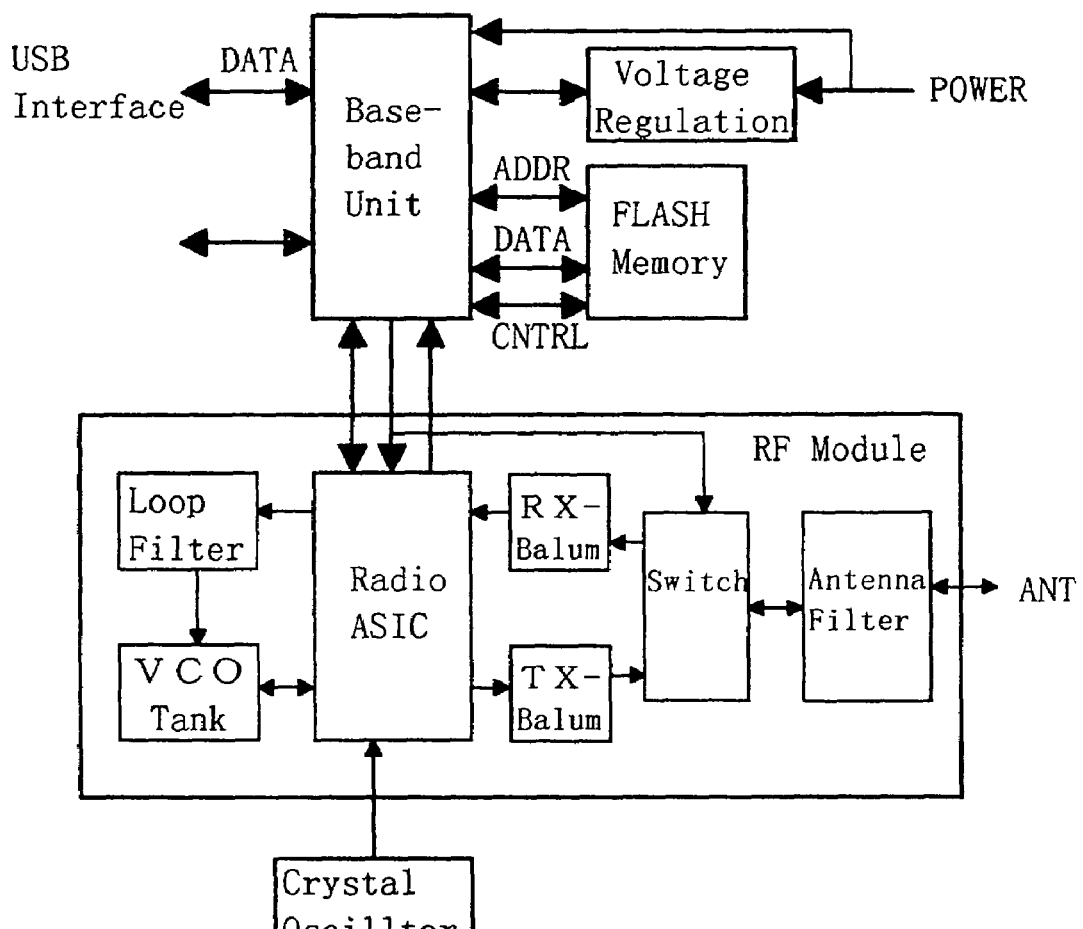
FIG. 2A is a block diagram of a wireless communication unit.
Figure 2B:
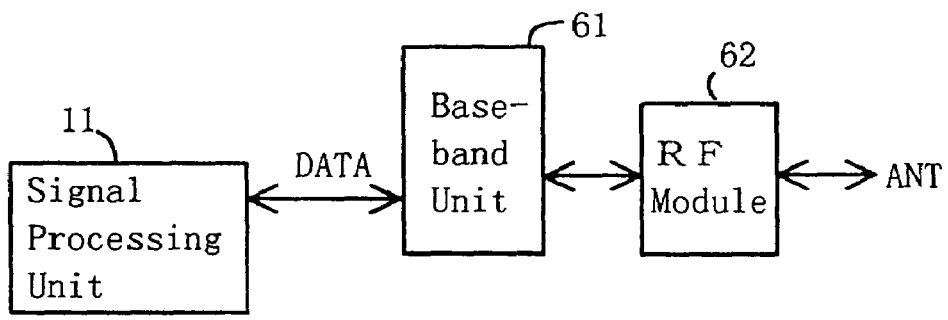
FIG. 2B shows an ordinary connection between a signal processing unit and a wireless communication unit of a personal computer.

The wireless communication unit of each of the information processing devices 1, 3, 4, 5 and 6 may have a hardware configuration as schematically shown in FIG. 2A. FIG. 2B shows an ordinary data flow through a wireless communication unit including a baseband unit 61 and an RF or wireless module 62 shown in FIG. 2A, and a signal processing unit (signal processor) 11 connected to the communication unit via a USB interface (FIG. 2A).

When installed, the information processing devices 1–7 are assigned with respective specific addresses. Each of the information processing devices 1–7 is provided with one or more communication units for mutual communications. Each of the information processing devices 1, 3 and 4 may be provided with a communication unit for communication with the mobile communication network access point 8, and assigned with its own telephone number. The device 1 may transmit RF signals 13T–18T to and receive RF signals 13R–18R from the other devices 3–8, respectively. The transmission power of the short-distance wireless communication unit, the wireless LAN communication unit and/or the mobile station communication unit of each of the information processing units can be adjusted by controlling a transmitter amplifier gain, an attenuator attenuation factor, an antenna gain and/or an antenna direction of a directional antenna by means of the communication monitoring and controlling function provided for each information processing device.

In the first embodiment, the short-distance wireless communication unit i of each information processing device may have a higher transmission power $H_{i,j}$ for communication with the communication unit j of a particular device, and a lower transmission power $L_{i,j}$ which is lower than the higher transmission power level $H_{i,j}$. The higher transmission power level $H_{i,j}$ may be equal to or lower than, for example, 1 mW, the highest power level according to the Bluetooth Power Class 3 for communications over about 10 m. Alternatively, the higher transmission power level may be the same for communications with the communication units of all the other information processing devices j. In such case, the higher transmission power level is expressed as $H_i$ hereinafter. As is understood from the above, depending on the communication unit j with which the communication unit i is to communicate, the higher transmission power level $H_{i,j}$ and the lower transmission power level $L_{i,j}$ may differ. A user can set these transmission power levels for a particular environment in which the information processing devices are disposed, in the signal processing units (processors) in the transmission power setting mode of the wireless communication monitoring and controlling program, for example.

The user may select a setting mode display on the personal computer 1 and enter titles of available application programs or device data, such as types of the information processing devices with which the personal computer 1 is to communicate or protocols by which the communication is to be done. Then, he or she modifies, through a keyboard, the transmission power default values (for example, the highest transmission power of 1 mW and other values) by entering the higher transmission power level $H_i$ or $H_{i,j}$ and the lower transmission power level $L_{i,j}$ for each of the entered application programs or device data, to generate a lookup table showing the relation between the respective information processing devices j with which the personal computer 1 is to communicate with and the higher transmission power level $H_1$ or $H_{1,j}$ and the lower transmission power level $L_{1,j}$.

The same procedure is followed for the communication units of the peripheral devices 5 and 6 for setting their respective higher and lower transmission power levels $H_{5,j}$ and $L_{5,j}$ and $H_{6,j}$ and $L_{6,j}$. Alternatively, such transmission power levels may be set through the personal computer 1.

For example, referring also to FIG. 10 which will be described later in detail, if the distance between the personal computer 1 and the printer 6 is 3 m, the higher transmission power level $H_{12}$ of the communication unit 12 of the personal computer 1 may be set to 1 mW, for ensuring reliable communication with the farthest device, with the lower transmission power level $L_{12,62}$ for a communication unit 62 of the printer 6 set to 0.1 mW, and the higher transmission power level $H_{62}$ of the printer communication unit 62 may be set to 0.5 mW for ensuring reliable communication with the farthest device, the personal computer 3, with the lower transmission power level $L_{62,12}$ for communication with the personal computer communication unit 12 set to 0.1 mW. As stated previously, the higher transmission power levels of the communication units 12 and 62 may be set, depending on the distances from information processing devices with which they are to communicate.

Alternatively, instead of entering the determined transmission power levels $H_i$ or $H_{i,j}$ and $L_{i,j}$, the distances between a communication unit i of an information processing device, e.g. the personal computer 1, and the communication units j of other devices which the communication unit i is to communicate with may be entered. Also, the user enters the environmental conditions (e.g. a parameter n used in the later-mentioned equation (1)) for the respective information processing devices. Then, the signal processing unit associated with the communication unit i calculates the transmission power levels $H_i$ or $H_{i,j}$ and $L_{i,j}$, for the respective ones of the other communication units, based on the entered distances and environmental conditions, and generates a lookup table showing the relation between the respective application programs or device data, the distances, and the transmission power levels $H_i$ or $H_{i,j}$ and $L_{i,j}$.

In one aspect of the present invention, if the personal computer 1 is currently communicating with one device, e.g. the printer 6, it transmits data at the higher transmission power level $H_{12}$ or $H_{12,62}$, and the communication unit 62 of the printer 6 transmits back data to the communication unit 12 at the higher transmission power level $H_{62}$ or $H_{62,12}$. If it becomes necessary for the personal computer 1 to communicate simultaneously with two or more information processing devices, e.g. the printer 6 and the access point 7, the communication unit 12 of the personal computer 1 changes the transmission power level for one device, e.g. the printer 6, to the lower transmission power level, e.g. $L_{12,62}$, so that a RF signal transmitted to the one device, e.g. the printer 6, 16T, may not substantially interfere with the reception of a RF signal from the other device, e.g. the access point 7, 17R.

The personal computer 1 may be arranged to change the transmission power level of the other device, i.e. the printer 6 in the present example, used for the communication with the persona computer 1, to the lower transmission power level $L_{62,12}$ so that a RF signal 16R transmitted from the printer 6 to the personal computer 1 may not substantially interfere with RF signals transmitted between other devices, e.g. the personal computer 3 and the digital camera 5, with which the personal computer 1 is currently not related.

FIG. 3 exemplifies an arrangement of various information processing devices according to the first embodiment of the present invention. In FIG. 3, three information processing devices are exemplified. A first information processing device 10 may be, for example, the notebook personal computer 1 shown in FIG. 1, which includes a signal processing unit or processor 11 with a communication monitoring and controlling function, one short-distance wireless communication unit 12, and one long-distance, mobile station wireless communication unit 13 for mobile communication such as a personal digital cellular.

The signal processing unit 11 may be a conventional information processor of a computer including a CPU, ROM and a RAM. The information processing device 10 is arranged to be loaded with a recording medium 19 in which a communication monitoring and controlling program according to the present invention is stored, and the signal processing unit 11 takes in and executes the program stored in the recording medium 19.

A second device 20 may be one of the personal computer 3, the PDA 4, such as an electronic note, a facsimile machine connected to a telephone line, and the like, shown in FIG. 1. The second device 20 includes a signal processing unit 21 with a communication monitoring and controlling function, and at least one short-distance wireless communication unit 22.

A third information processing device 30 may be an access point (e.g. the access point 8 shown in FIG. 1) for the mobile communication of, for example, the personal digital cellular system, the personal handyphone system, or the CDMA system, and includes a multiple channel access wireless communication unit 32.

The short-distance wireless communication units 12 and 22 may be built-in wireless modules, which may make communications within a range of about 10 m with the highest power of 1 mW according to Power Class 3 of the Bluetooth Standard. The communication units 12 and 22 include respective transmission power adjusting elements 121 and 221 to be controlled, such as an attenuator, a transmitter amplifier and a driving motor for an antenna, which will be described in detail later.

The communication monitoring and controlling function of each information processing device has been described as being part of a signal processor which also executes ordinary personal computer information processing, but it may be provided by a separate unit different from the information processing unit of the personal computer or information processing device.

Now, the example shown in FIG. 3 is described as including a notebook personal computer as the first device 10 and an electronic note (PDA) as the second information processing device 20.

FIGS. 4A, 4B, 4C, 5 and 6 are flow charts including general communication procedures according to the Bluetooth Standard to be followed by the signal processing units 11 and 21 and the wireless communication units 12 and 22, for use in explaining how the communications carried out in the personal computer 10 are monitored and controlled or optimized.

Figure 4A:
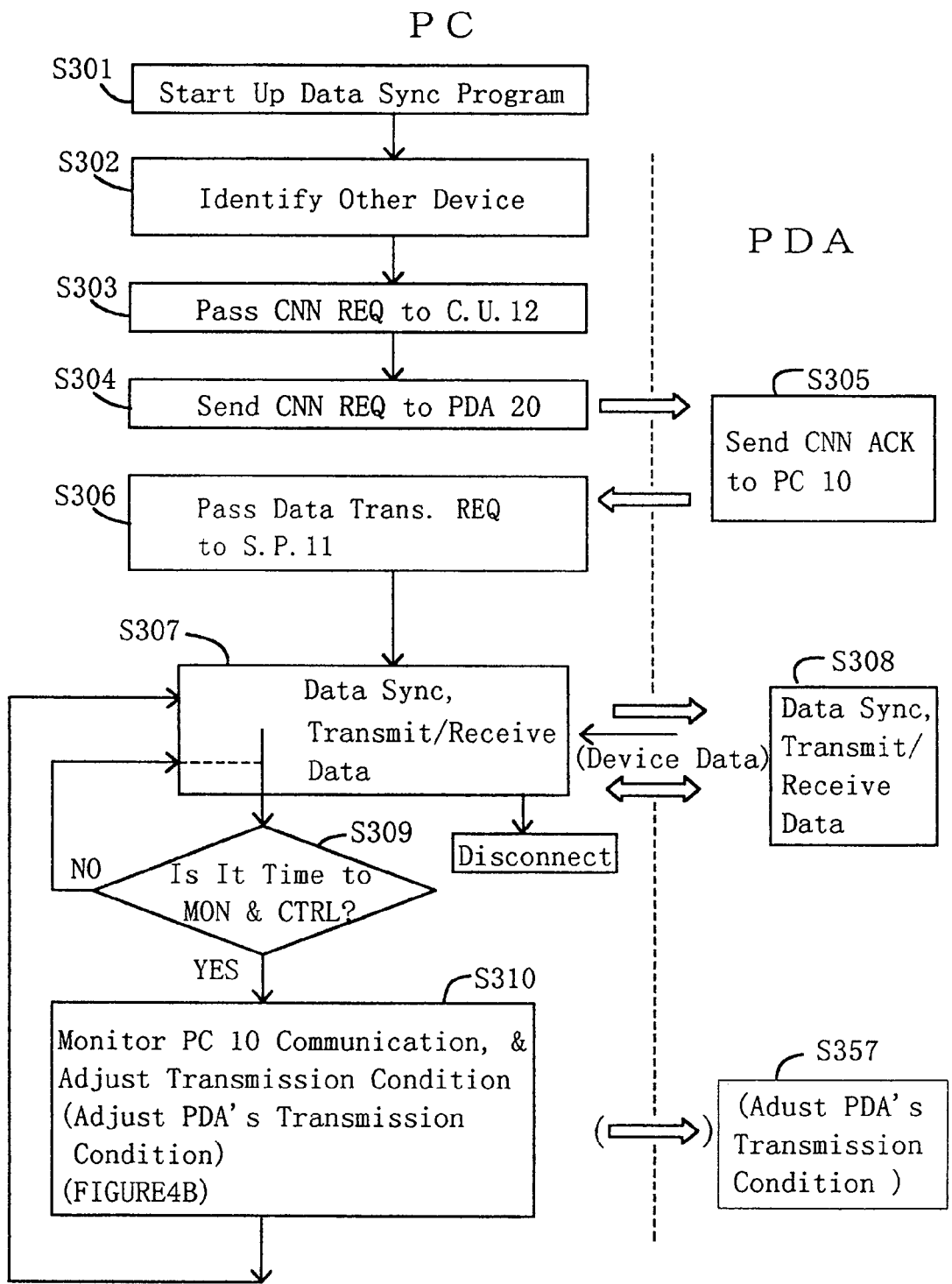
FIG. 4A is a flow chart illustrating the procedure for communications between a personal computer and a personal digital assistant (PDA) according to the first embodiment.

Referring to FIGS. 3 and 4A, how communications are initiated by the personal computer 10 with respect to the PDA 20 is described.

In Step 301 in FIG. 4A, the signal processing unit 11 of the personal computer 10 starts up a data synchronizing program for synchronizing or updating a specific type of data, such as a schedule, a todo, a memo, addresses, telephone numbers and the like, stored in one of the personal computer 10 and the PDA 20 with updated data of the same type stored in the other. In Step 302, the signal processing unit 11 judges that the other device to communicate with is a PDA from the title of the started application program or data synchronizing program, or a parameter or address of the other device associated with the application program. In Step 303, the signal processing unit 11 sends to the communication unit 12, a data link connection request for connection to the PDA 20.

In Step 304, the communication unit 12 responds to the connection request and transmits a connection request signal to the communication unit 22 of the PDA 20. The transmission power of the communication unit 12 of the personal computer 10 employed is preferably the higher level $H_{12}$ or $H_{12,22}$ (e.g. 1 mW) in the initial state of the unit 12. In General, if the other device need not be identified or cannot be identified, the higher transmission power $H_i$ can be used, and if the other device j can be identified, the initial transmission power may be $H_{i,j}$. Alternatively, the higher transmission power level $H_{12}$ or the lower transmission level $L_{12,22}$ (e.g. 0.15 mW) used at the end of the previous communication with the PDA 22 may be used.

Next, in Step 305, upon receipt of the connection request signal, the communication unit 22 of the PDA 20 supplies a connection request to the signal processing unit 21, and the unit 21 responds to the connection request by sending an ACK or connection permission to the communication unit 22. The communication unit 22 sends back a connection permission (ACK) signal to the communication unit 12 of the personal computer 10. The transmission power level of the communication unit 22 of the PDA 20 may be determined by the PDA itself in a manner as described with reference to the communication unit 12. In such a case, too, the transmission power level of the communication unit 22 is preferably set to the higher level $H_{22}$ (e.g. 0.5 mW) employed in the initial state, but it may be set to the higher level $H_{22}$ or the lower level $L_{22,12}$ (e.g. 0.15 mW) employed at the end of the last communication with the communication unit 12.

The transmission of the ACK signal from the unit 22 to unit 12 establishes a data link (SCO or ACL link) between the communication units 12 and 22.

In Step 306, the communication unit 12, upon receipt of the AC signal from the communication unit 22, sends a data transmission request to the signal processing unit 11. After that, the signal processing unit 11 and the communication unit 12 of the personal computer 10 executes Step 307.

Steps 307 and 308 represent comprehensively the data transfer between the personal computer 10 and the PDA 20. In Step 307, the signal processing unit 11 starts synchronizing particular data, such as the schedule, the todo, the memo, the addresses, the telephone numbers etc. Then, the communication unit 12 starts transmitting the particular data to the communication unit 22 of the PDA 20. In response, the communication unit 22 starts receiving the transmitted data in Step 308.

In Step 307, the signal processing unit 11, before transmitting the particular data, may request the other device, in this case, the PDA 20 with which it is to communicate, to send the signal processing unit 11 device data of the other device (PDA 20), such as its device type or communication type. In response to such a request, the signal processing unit 21 of the PDA 20 sends the requested device data to the signal processing unit 11 via the communication units 22 and 12, in Step 308. In Steps 307 and 308, during the data transfer between the personal computer 10 and the PDA 20, the two communication units 12 and 22 execute the Bluetooth packet time-slot transfer control protocol including error correction, so that communication control signals are also transferred.

When the PDA 20 has data to be transmitted to the personal computer 10, the signal processing unit 21 of the PDA 20, in response to a request of the signal processing unit 11 or 21, can transmit the data to the signal processing unit 11 of the personal computer via the communication units 22 and 12.

While data is being transferred in Step 307, it is judged whether it is the time to monitor the communication state of the personal computer 10 or not in Step 309. If it is the time, the procedure advances to Step 310 and, then, returns to Step 307. The time to advance to Step 310 for the first time may be, for example, the time following the start of data transfer in Step 307 by the communication unit 12 of the personal computer 10. Second and subsequent time, the procedure may advance to Step 310 a predetermined delay time (e.g. two seconds) after the procedure returns from Step 310 to Step 307. Alternatively, the second and subsequent advancing to Step 310 may be done periodically, for example at intervals of three seconds, or may be done, for example, each time one packet is transmitted or each time a predetermined number of time slots passes.

In Step 310, the signal processing unit 11 of the personal computer 10 sees the communication states of the communication units 12 and 13 and, if necessary, adjusts the communication condition or parameter of the communication unit 12 so that the RF signal sent from the unit 12 may not interfere with the RF signal reception by the communication unit 13.

Figure 4B:
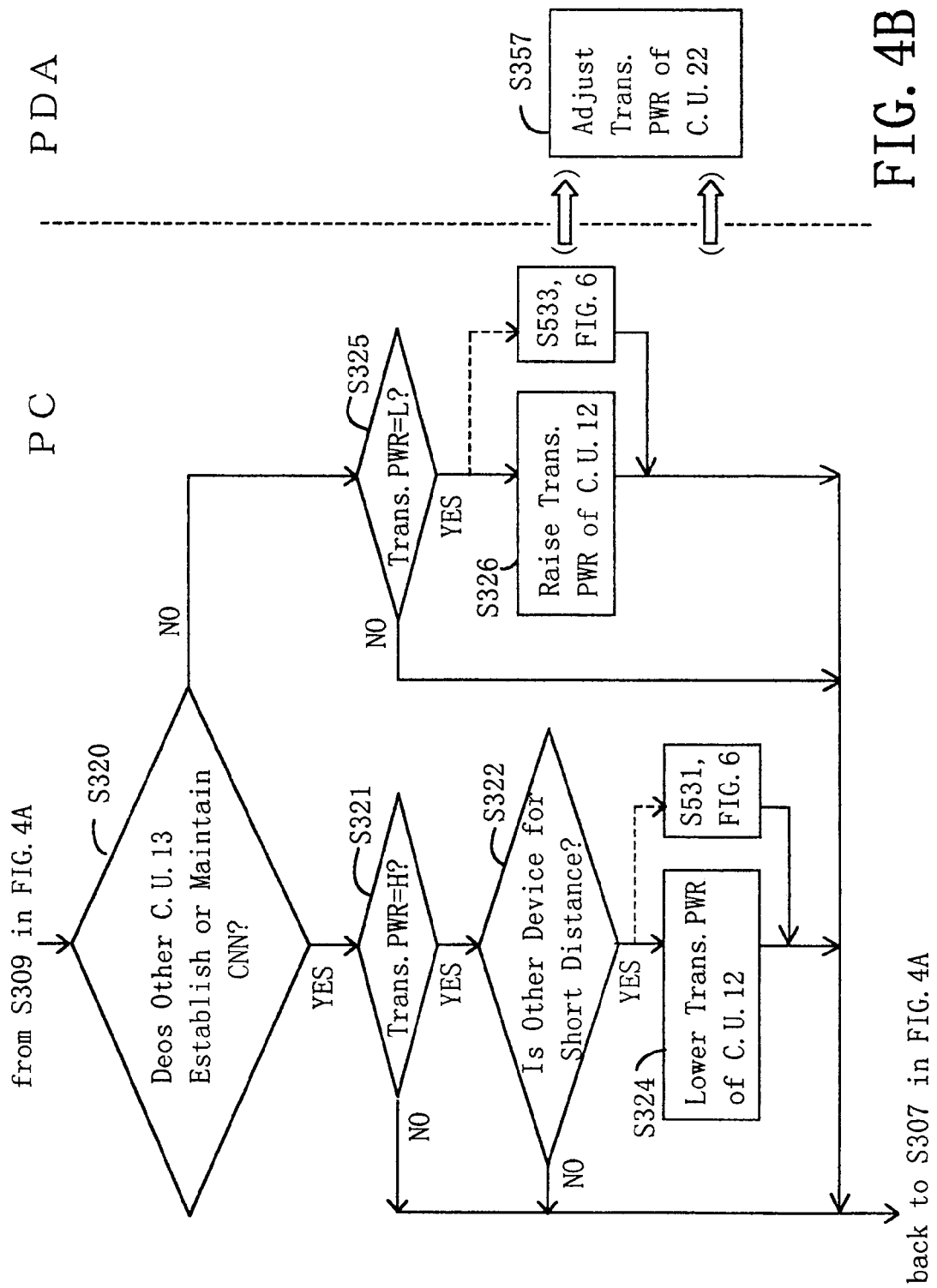
FIG. 4B shows in detail one of the steps in the flow chart of FIG. 4A.

FIG. 4B shows Step 310 in detail. In Step 320, the signal processing unit 11 makes judgment as to whether or not there is currently connection request for connection to the other unit 13, which means the communication unit 13 may be connected to some other information processing device, or whether or not the unit 13 is currently in connection with some other device. If there is such connection request or if the unit 13 is connected, the procedure goes to Step 321 where the signal processing unit 11 detects whether the transmission power level of the communication unit 12 is the higher level H or not. If the power level is not H, the procedure returns to Step 307 and the data synchronization and data transfer are continued.

If it is known that the transmission power of the communication unit 12 is at the higher level H in Step 321 in FIG. 4B, the signal processing unit 11 judges whether or not the other device with which the communication unit 13 is communicating is a short-distance device (i.e. a device operating under the Bluetooth Standard), based on the application program being used, or the address of the other device, or the received or stored device data of the other device. If it is judged that the other device is not a short-distance communication unit, for example, if it is the communication unit 32 for mobile communication at the access point 30 shown in FIG. 3, the procedure returns to Step 307.

If the other device is a short-distance communication unit, the signal processing unit 11 determines the distance between the other device and the personal computer 10 from the application program being used or the device data of the other device, and determines the lower transmission power level, for example, 0.15 mW, for the determined distance, so as to reduce RF signal interference at the other communication unit 13. The distances between the respective devices have been entered previously by the user.

Then, the signal processing unit 11 lowers the transmission power of the communication unit 12 to the lower level by controlling the signal attenuation provided by an attenuator, the gain of a transmitter amplifier, the gain of an antenna or the direction of the antenna, as will be described in detail later. In doing so, the signal processing unit 11 refers to the lookup table prepared beforehand as stated previously, which shows the correlation of the applications programs, the device addresses, the device data, the distances and the lower transmission power levels, to determine an appropriate lower transmission power level $L_{12,22}$ for communication with the PDA 20. Then, the procedure returns to Step 307.

If it is known, in Step 320, that there is no connection request for the other communication unit 13 or that the unit 13 is not currently connected to any other unit, whether the transmission power of the communication unit 12 is at the lower level or not, or whether it is lower than the higher level or not. If the transmission power level is the lower level, the signal processing unit 11 requests, in Step 326, the communication unit 12 to return its transmission power to the higher level $H_{12}$ or $H_{12,22}$ so as to increase the communication reliability by, for example, reducing the data error rate. In response to the request of the unit 11, the communication unit 12 returns its transmission power level to $H_{12}$ or $H_{12,22}$ by, for example, adjusting the attenuation factor of the attenuator, the transmitter amplifier gain, the antenna gain or the antenna direction. After Step 326, the procedure returns to Step 307.

In Step 325, if it is found that the transmission power of the communication unit 12 is not at the lower level, the procedure returns to Step 307.

Steps 309 and 310 and, therefore, Steps 320–326 shown in FIG. 4B, may be executed concurrently with the data transfer in Step 307, or may be executed by interrupting the data transfer procedure. Steps 309 and 310 are no longer called once the data transfer done in Steps 307 and 308 is over.

Figure 4C:
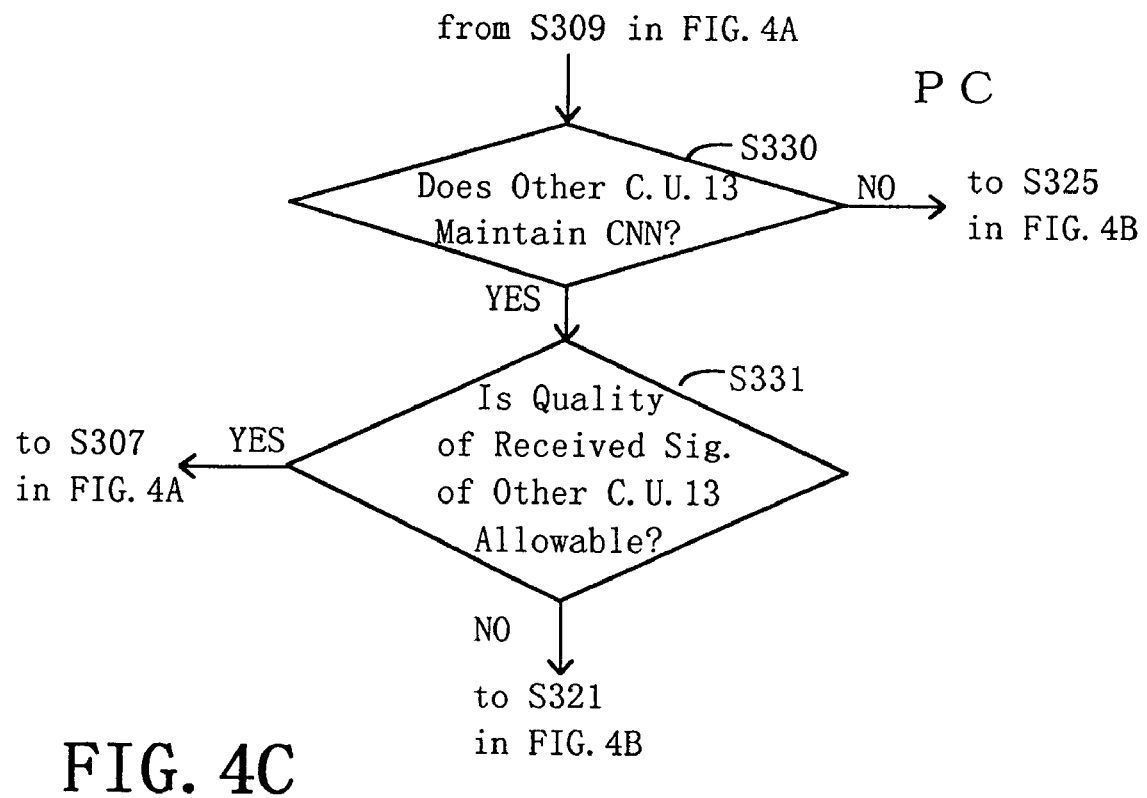
FIG. 4C shows steps which may be substituted for one of the steps in the flow chart of FIG. 4A.

Instead of making judgment about the connection of the other communication unit 13 in Step 320 of FIG. 4B, the signal processing unit 11 may judge the quality of the signal received by the unit 13, as shown in FIG. 4C. In this alternative, during the time period in which Step 307 is being executed, the signal processing unit 11 of the personal computer 10 monitors, the RF signal received by the communication unit 13 for its quality, e.g. the data error rate or the ratio of ACK to NAK sent back from the unit 13 to the other device. In Step 330 shown in FIG. 4C following Step 309, the signal processing unit 11 makes judgement as to whether or not the other communication unit 13 is currently connected to any other device. If not, the procedure goes to Step 325 shown in FIG. 4B, and if the unit 13 is connected to any other information processing device, whether or not the signal quality of the signal received by the unit 13 is above an allowable level is judged in Step 331. If the signal quality is below the allowable level, the procedure goes to Step 321. If, on the other hand, the signal quality is allowable, which means no substantial RF signal interference exists, the procedure returns to Step 307.

Figure 5:
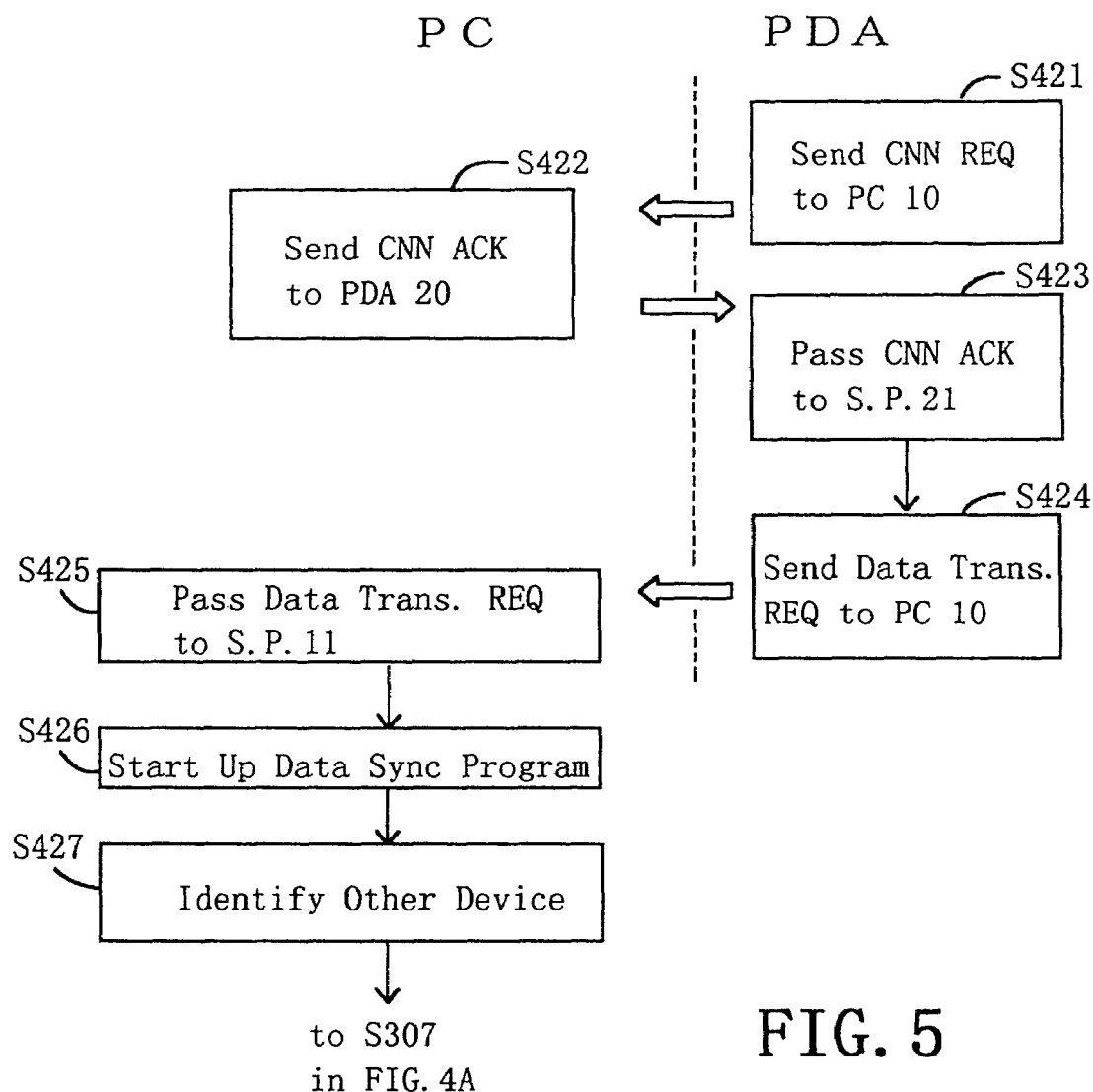
FIG. 5 is a flow chart illustrating the procedure for communications between the personal computer and the personal digital assistant initiated by the personal digital assistant.

Next, referring to FIG. 5, the procedure in which the PDA 20 initiates the communications with the personal computer 10 is described.

First, in Step 421, the signal processing unit 21 of the PDA 20 supplies the communication unit 22 with connection request for connection to the personal computer 10, and the unit 22 sends a connection request signal to the personal computer 10. In Step 422, upon receipt of the connection request signal, the communication unit 12 of the personal computer 10 sends connection request to its signal processing unit 11. In response to the connection request, the unit 11 sends connection permission or ACK to the communication unit 12. Then, an ACK signal is sent to the PDA 20. Thus, connection between the PDA 20 and the personal computer 10 is established.

In Step 423, the communication unit 22 of the PDA 20, upon receipt of the ACK signal, sends connection permission to the signal processing unit 21. Then, in Step 424, the unit 21 responds to the connection permission by sending the communication unit 22 data transmission request for requesting the personal computer 10 to transmit data to PDA 20. Then, the unit 22 sends a data transmission request signal to the communication unit 12 of the personal computer 10.

In Step 425, upon receipt of the data transmission request signal, the communication unit 12 of the personal computer 10 sends data transmission request to the signal processing unit 11. The unit 11, in Step 426, responds to the data transmission request by starting the data synchronization to transfer data between the units 11 and 21 in a manner similar to the one described previously. Then, in Step 427, the signal processing unit 11 of the personal computer 10 makes judgment that the device with which it is communicating is the PDA 20, based on the application program being currently used for data transfer between the personal computer 10 and the PDA 20. After that, the personal computer 10 and the PDA 20 follow Steps 307–310.

The signal processing unit 10 can use the addressee of the connection request signal sent from the PDA 20 instead of the device address to identify the device with which it is communicating.

The signal processing unit 21 of the PDA 20 may be arranged to control the transmission power of the communication unit 22 in the same manner as the signal processing unit 11 of the personal computer 10. Alternatively, the personal computer 10 commands the PDA 20 to control the transmission condition or parameter of the communication unit 22. This procedure is now described with reference to FIGS. 6A and 6B.

Figure 6A:
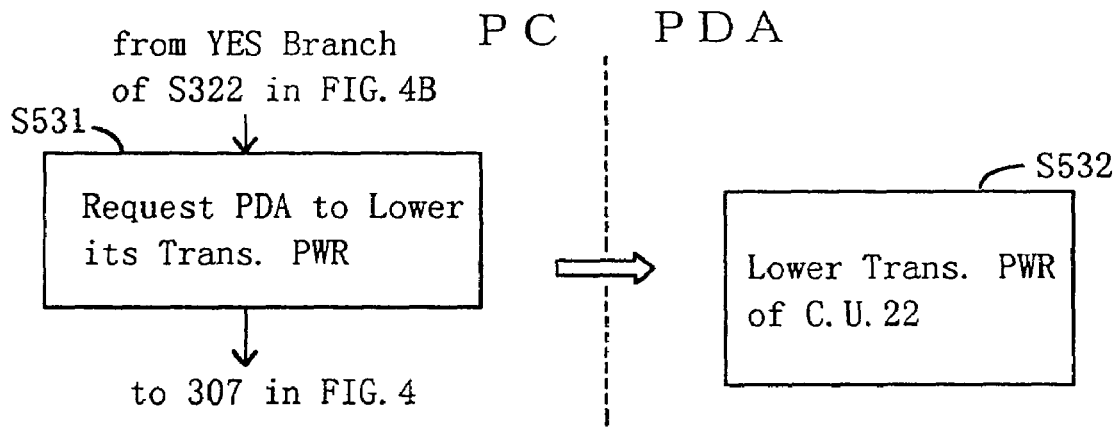
FIGS. 6A and 6B show how the personal computer adjusts the transmission condition of the communication unit of the personal digital assistant.

If it is known in Step 322 (FIG. 4B) that the PDA 20 and its communication unit 22 are for short-distance communications, the signal processing unit 11 of the personal computer 10 executes Step 324 and also requests the PDA 20 to lower the transmission power of the communication unit 22 to the lower level $L_{22,12}$ in Step 531 shown in FIG. 6A. In Step 532, the signal processing unit 21 responds to the request sent from the unit 11 through the communication unit 22 by lowering the transmission power level at the communication unit 22 down to $L_{22,12}$. After that, the procedure returns to Step 307 (FIG. 4A).

Figure 6B:
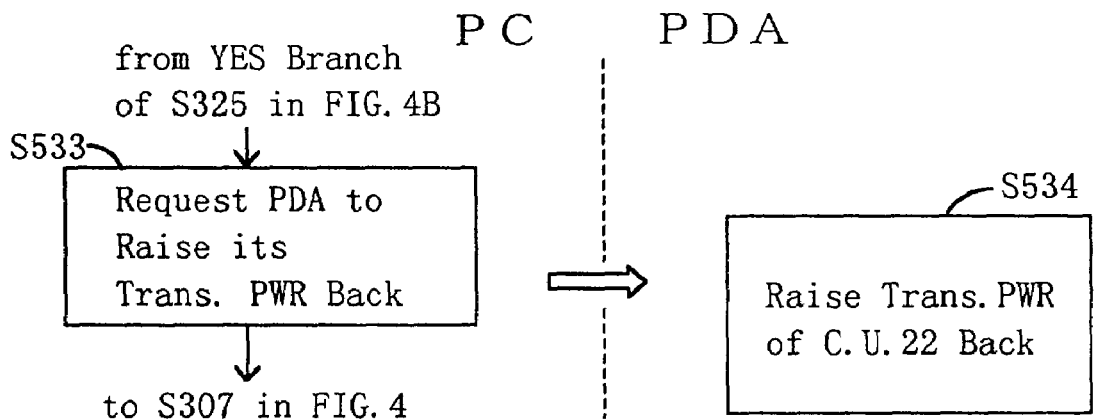

If, in Step 325 shown in FIG. 4B, it is judged that the transmission power of the communication unit 12 is at the lower level, Step 326 is executed and, at the same time, the PDA 20 is requested, in Step 533 in FIG. 6B, through the communication unit 12 to return the transmission power level of the communication unit 22 to the higher level. In response to this request, the signal processing unit 21 of the PDA 20 raised the transmission power of the unit 22 to the higher level in Step 534. The procedure, then, returns to Step 307.

Figure 7A:
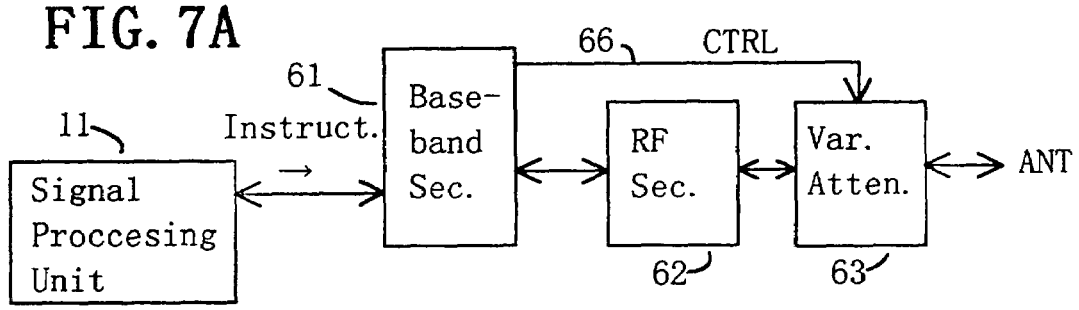
FIGS. 7A through 7D illustrate how the transmission power level or an antenna are controlled by the signal processing unit.
Figure 7B:
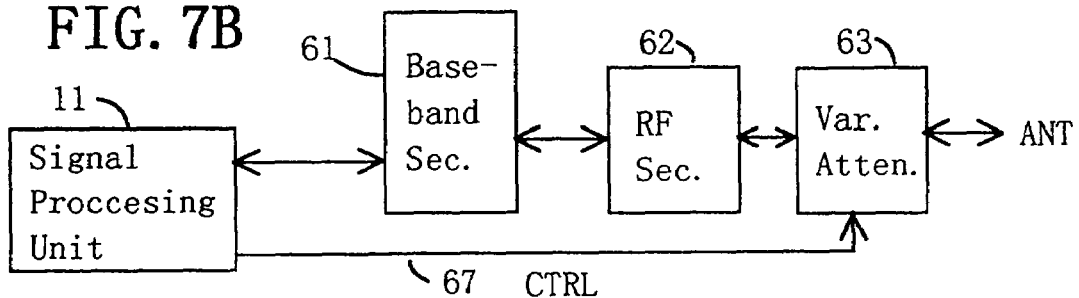

As described above, in Step 324 or 326, the signal processing unit 11 of the personal computer 10 commands the communication unit 12 to change the transmission power to the predetermined lower or higher level. FIGS. 7A and 7B show the connection of the signal processing unit 11, a baseband signal section 61, a RF section 62 and a variable attenuator 63 connected to an antenna, for adjusting the attenuation factor or amount of attenuation provided by the variable attenuator 63. The baseband signal section 61, the RF section 62 and the variable attenuator 63 are parts of the communication unit 12. In FIG. 7A, the signal processing unit 11 commands the baseband signal section 61 to adjust the attenuation factor of the variable attenuator 63, and the baseband signal section 61 sends a control signal 66 to the attenuator 63 to adjust the amount of attenuation provided by the attenuator 63. In the arrangement shown in FIG. 7B, the signal processing unit 11 supplies a control signal 67 directly to the attenuator 63 for controlling the amount of attenuation.

Figure 7C:
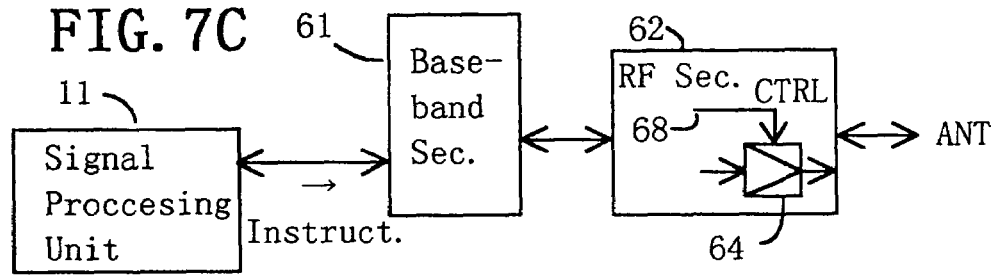

FIG. 7C illustrates an arrangement in which the signal processing unit 11 commands the RF section 64 via the baseband signal section 61 to adjust the gain of a transmitter amplifier 64 in the RF section 62. The RF section 62 controls the gain of the amplifier 64 with a control signal 68. FIG. 7*b* shows an arrangement in which the signal processing unit 11 sends a control signal 69 to an antenna driving motor 65 to adjust the length of an antenna, e.g. the antenna 114 shown in FIG. 1, to control the gain of the antenna. The antenna gain increases as the length of the antenna is increased, and vice versa.

Figure 7D:
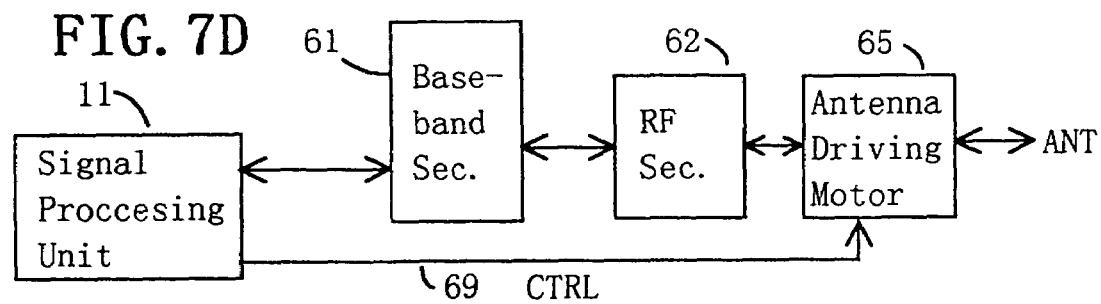

Instead of changing the transmission power of the communication unit 12, the signal processing unit 11 may send a control signal or data to the communication unit 12 to control an antenna driving motor shown in FIG. 7D so as to change the direction of a horizontal antenna rod of an antenna, e.g. the antenna 112 shown in FIG. 1, which can rotate in a substantial horizontal plane. In FIG. 7D, the signal processing unit 11 provides an antenna control signal 69 to directly control the antenna 112. The antenna orientation is changed so that the amount of an RF signal emitted from the transceiver antenna of the communication unit 12 as received by the transceiver antenna of the other communication unit 13 in the same personal computer 10 may be reduced.

Generally, assuming that an antenna of one device has a known directivity, for example, a gain of 0 dB at 0° and −5 dB at 90°, that the power received at the communication unit of the other device when the antenna is directed in one direction is −65 dB, and that the minimum reception sensitivity of the communication unit of the other device is −70 dB, the one device can reduce the transmission power by a maximum amount of 5 dB by rotating the antenna to the 90° position so as to reduce the RF interference at the other communication unit of the one device. If the antenna directivity is unknown, the antenna direction may be changed stepwise by, for example, 10°. The other device feeds back the power of the RF signal sent from the antenna at each angular position as received at the other device, to thereby determine an optimum and allowable angular range.

Figure 8:
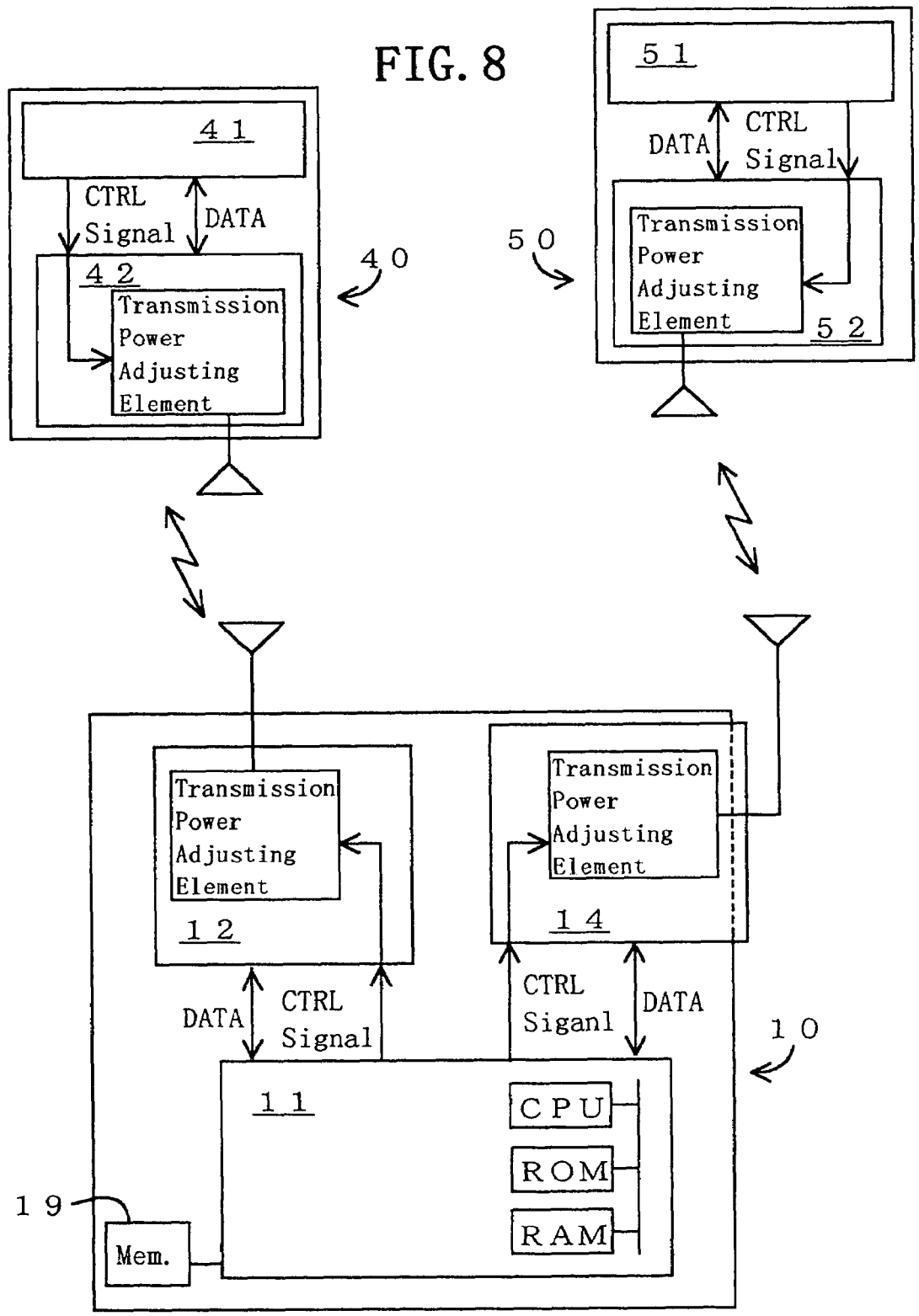
FIG. 8 is a block diagram of a second embodiment of the present invention.

FIG. 8 shows another arrangement of devices according to the present invention. The same reference numerals or legends as used in FIG. 3 are for the same or similar components.

In FIG. 8, first, second and third information processing devices 10, 40 and 50 are shown. The first information processing device 10 may be the notebook personal computer 1 shown in FIG. 1. Different from the personal computer 10 shown in FIG. 3, the personal computer 10 of FIG. 8 is shown as including a wireless LAN communication unit 14 in the form of a card inserted into a slot provided on the computer 10, in addition to the signal processing unit 11 and the short-distance wireless communication unit 12. The second information processing device 40 can be a digital camera 5 shown in FIG. 1, which includes a signal processing unit 41 with a communication monitoring and control function and at least one short-distance wireless communication unit 42. The third information processing device 50 can be, for example, a wireless LAN access point 7 shown in FIG. 1, which includes a signal processing unit 51 with a communication monitoring and controlling function and a multiple-channel wireless LAN communication unit 52. The wireless LAN may use DBPSK or DQPSK modulation of the direct sequence spread spectrum system according to IEEE 802.11.

Now, communications between the personal computer 10 acting as a master and the digital camera 40 acting as a slave are described.

Figure 9A:
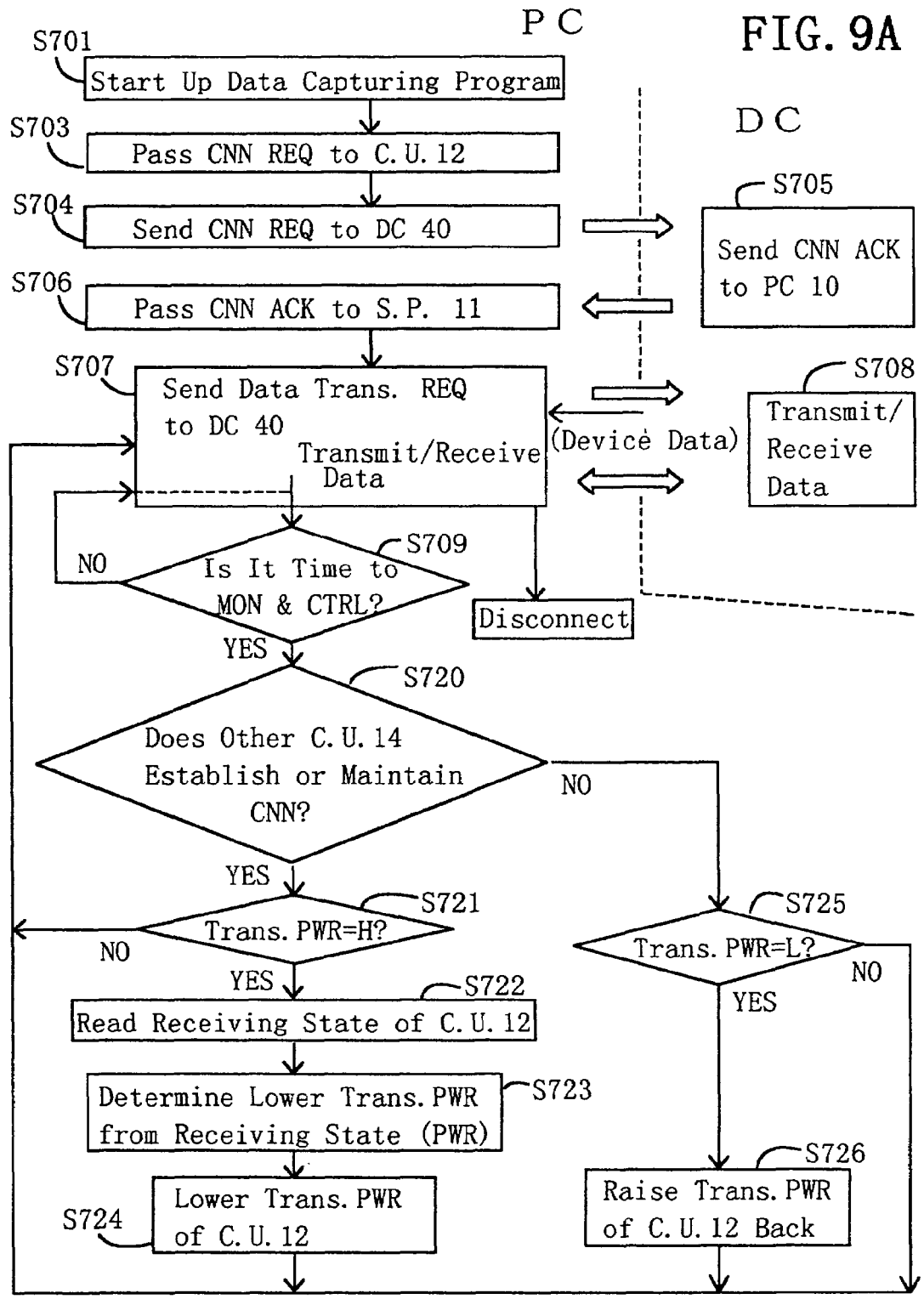
FIG. 9A is a flow chart of the procedure for communications between a personal computer and a personal digital assistant according to the second embodiment.

FIG. 9A is a flow chart showing the general procedure of communications followed by the signal processing units 11 and 41 and the communication units 12 and 42 shown in FIG. 8, useful for explaining how the transmission condition or parameter can be controlled.

The personal computer 10 executes a step for starting communications with the digital camera 40 for thereby taking in digital picture data from the digital camera 40. In Step 701, the signal processing unit 11 of the personal computer 10 starts up a program for transferring digital picture data in the digital camera 40 to the personal computer 10. In Step 703, the unit 11 sends to the communication unit 12 a data link connection request for connection to the digital camera 40. In Step 704, in response to the connection request of the signal processing unit 11, the communication unit 12 sends a connection request signal to the communication unit 42 of the digital camera 40. The transmission power at the communication unit 12 is preferably at the higher level (e.g. 1 mW), but it may be set to the higher level or the lower level $L_{12,42}$ (e.g. 0.2 mW) which the communication unit 12 transmitted a RF signal at the end of the previous connection.

Next, in Step 705, upon receipt of the connection request signal, the communication unit 42 of the digital camera 40 makes connection request to the signal processing unit 41, which, in response to the connection request, send a connection permission signal through the communication unit 42 to the communication unit 12 of the personal computer 10. Thus, connection between the two communication units 12 and 42 has been established.

In Step 706, the communication unit 12 receives the connection permission signal from the communication unit 42 and supplies connection permission to the signal processing unit 11.

In Steps 707 and 708, data transfer is performed between the personal computer 10 and the digital camera 40. The signal processing unit 11 of the personal computer 10, upon receipt of the connection permission, transmits data transmission request to the signal processing unit 41 of the digital camera 40 through the communication units 12 and 42. In Step 708, the signal processing unit 41 starts sending picture data to the personal computer 10 via the communication unit 42.

In an alternative arrangement, the signal processing unit 11 of the personal computer 11 may, prior to sending picture data transmission request, request the digital camera 40 to send the device data of the digital camera 40 to the personal computer 10. In this case, in Step 708, the digital camera 40 sends the requested device data to the personal computer 10. During the data transfer performed between the personal computer 10 and the digital camera 40 in Steps 707 and 708, the Bluetooth packet time slot transfer control protocol including error correction is performed to transfer communication control signals between the communication units 12 and 42.

While the data transfer is being performed in Step 707, it is judged whether or not it is the time to monitor the communication state of the personal computer 10 in Step 709 in order to adjust the communication condition or parameter. If it is judged to be the time, the procedure goes to Step 720. The procedure will return to Step 707 from Step 721, 724, 725 or 726 as shown in FIG. 9A.

The timing to advance to Step 720 is the same as described with reference to Steps 309 and 310 in FIG. 4A.

In Steps 720 and 721, the signal processing unit 11 makes judgement as to whether it is necessary to control the transmission condition of the communication unit 12 in order to prevent RF interference with the other communication unit, namely, the wireless LAN communication unit 14, in the same personal computer 10.

First, in Step 720, the signal processing unit 11 judges whether or not there is currently a request for connection to the other communication unit 14, or whether or not the communication unit 14 is currently connected to any other information processing device. If there is a connection request for the unit 14 or if the unit 14 is currently connected to other device, a judgment is made by the signal processing unit 11 in Step 721 as to whether or not the transmission power level of the communication unit 12 is higher. If the transmission power is not at the higher level, the procedure returns to Step 707, and data transfer is continued.

The personal computer 10 has a lookup table showing the relation between the device data of other information processing devices including the digital camera 40, their higher transmission power levels at the beginning of communications, and their minimum acceptable receiving power level $L_{min}$. This lookup table can be prepared in a manner similar to the previously described one.

Let it be assumed that the environment conditions for transmitting and receiving signals to and from the personal computer 10 from and to the digital camera 40 are the same. Assuming that the transmission power of the communication unit 12 is at the higher level, the distance between the personal computer 10 and the digital camera 40 is calculated from the intensity at the communication unit 12 of the received RF signal sent from the communication unit 42 and the known higher transmission power of the communication unit 42, and the lower transmission power of the communication unit 12 is calculated from the distance and the minimum acceptable receiving power level $L_{min}$ of the digital camera 40, which is used to reduce RF interference. These calculations are done in Steps 722 and 723. For that purpose, if it is judged in Step 721 that the transmission power level is higher, then, in Step 722, the signal processing unit 11 of the personal computer 10 reads the received power intensity Pr as representing the state of the RF signal received from the communication unit 42, as detected at the communication unit 12. In Step 723, the signal processing unit 11 calculates the distance d between the personal computer 10 and the digital camera 40 based on the received power intensity Pr, using the following expression (1) showing the relation between the received power level and the distance.

$$Pr=(Pt \cdot Gt \cdot Gr \cdot \lambda^2)/(4\pi d)^n \tag{1}$$

By transforming the equation (1), the distance d can be expressed by the following equation (2).

$$d=[(Pt \cdot Gt \cdot Gr \cdot \lambda^2)/Pr]^{1/n}/4\pi \tag{2}$$

In these equations, Gt is a transmitter antenna gain, Gr is a receiving antenna gain, $\lambda$ is a wavelength, and Pt is a transmission power of a device, the digital camera 40 with which one information processing device, the personal computer 10 in the illustrated example, is communicating. The transmission power is predetermined for each of the devices and stored in the subject device, i.e. the personal computer 10 in the illustrated example. The transmission power of the other device, i.e. the digital camera 40 in the illustrated example, can be determined by the personal computer 10 from the application program activated by the signal processing unit 11, the address of the digital camera 40 or the device data of the digital camera 40 received from the digital camera 40 or pre-stored in the personal computer 10. The letter n in the equations is a constant, which is equal to two (2) in the free space. It is from two to three in an office environment, and can be selectively set for a particular office environment. In the following discussion, the constant n is assumed to be equal to two (2).

Now that the distance d has been determined, the optimum transmission power for the communication unit 12 can be determined. Let it be assumed that the minimum acceptable receiving power of the communication unit 42 of the digital camera 40 is −60 dBm, Gt and Gr are each equal to 0 dBi, and $\lambda$=0.125 m (2.4 GHz band). If the distance d is 10 m, the transmission power of the communication unit 12 should be 0 dBm. If the distance d is 3 m, the transmission power of the communication unit 12 can be −10 dBm.

By reducing the transmission power of the communication unit 12 in this manner, interference with the reception of RF signals by the other communication unit 14 of the personal computer 10 can be reduced.

Figure 9B:
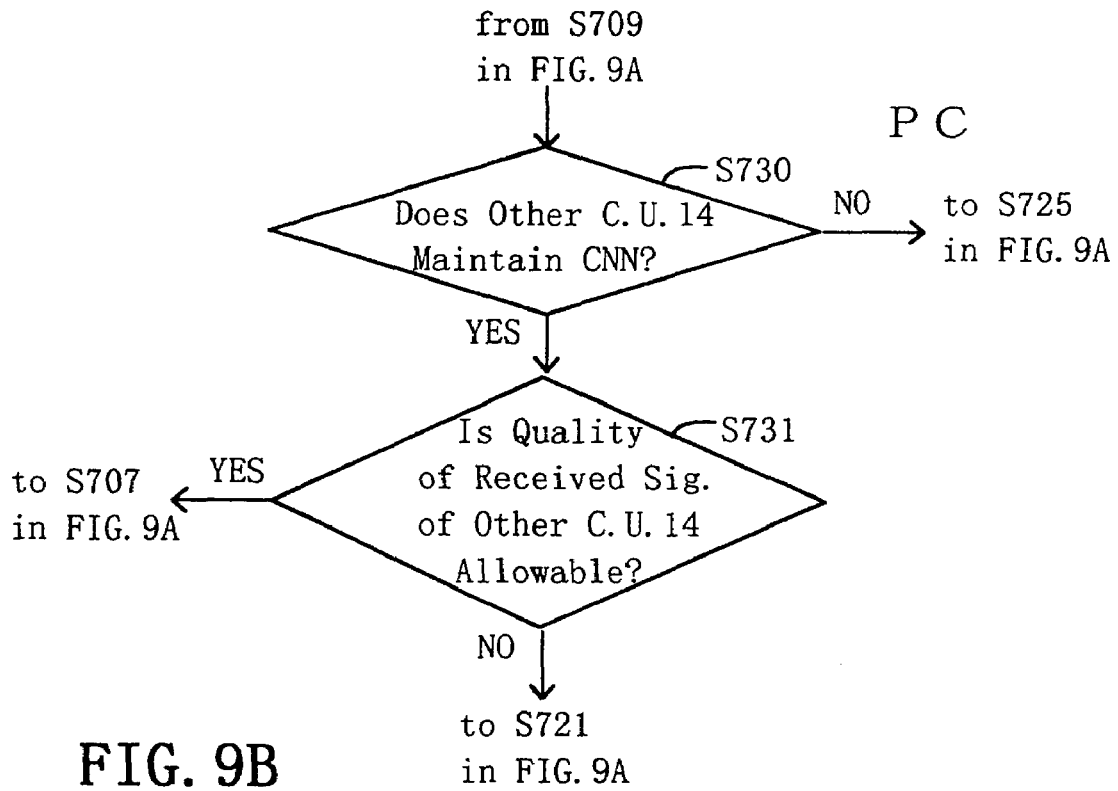
FIG. 9B shows steps which may be substituted for a step in the flow chart of FIG. 9A, and FIGS. 9C and 9D show steps which may be substituted for part of the flow chart of FIG. 9A.
Figure 9C:
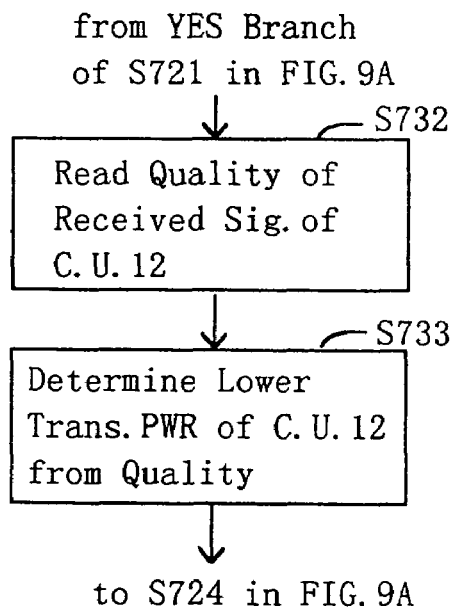

Instead of using the received power intensity as representation of the state of the received RF signal in Steps 722 and 723 as described above, the signal processing unit 11 may use the quality of received RF signal at the communication unit 12 as shown in FIG. 9C. The RF signal is sent from the communication unit 42 of the digital camera 40 at a known transmission power level. The received signal quality may be represented by a received data error rate, the ratio of ACK to NAK sent from the communication unit 12 to the digital camera 40 or the occurrence (e.g. frequency) of request for resending data sent from the personal computer 10 to the digital camera 40. The signal quality is detected in Steps 732 and 733 in FIG. 9C. Based on the detected received RF signal quality and the allowable signal quality, the lower transmission power level for the communication unit 12 is calculated, and the transmission power of the unit 12 can be changed to the calculated lower transmission power.

Now, returning to FIG. 9A, in order to reduce RF signal interference at the communication unit 14 of the personal computer 10, the signal processor 11, in Step 724, lowers the transmission power level of the unit 12 to the lower level by means of using data or control signals as previously described with reference to FIGS. 7A, 7B, 7C and 7D. Specifically, the signal processing unit 11 causes the unit 12 to adjust the transmission condition or parameter, such as the attenuation factor of the attenuator 63, the gain of the transmitter amplifier 64, or the length or direction of the transmitter antenna. Then, the procedure returns from Step 724 to Step 707.

On the other hand, if it is known in Step 720 that there is no connection request for the other wireless communication unit 14 of the personal computer 10 or if the communication unit 14 is currently not connected to any device, the signal processing unit 11, in Steps 725 and 726, detects the transmission condition of the communication unit 12 and, if necessary, adjusts the transmission condition in order to increase the reliability of communications by the communication unit 12. In Step 725, the signal processing unit 11 judges whether or not the current transmission power of the communication unit 12 is at the lower level (or lower than the higher transmission power level). If it is at the lower level, the signal processing unit 11 requests the communication unit 12 to return its transmission power level to the higher one in Step 726. In response to the request, the communication unit 12 adjusts, for example, the variable attenuator attenuation factor, the transmitter amplifier gain, the transmitter antenna gain or direction in such a manner as to return the transmission power level to the higher one. After that, the procedure returns to Step 707.

If it is found that the transmission power of the communication unit 12 is not at the lower level in Step 725, the procedure goes to top S707.

As in the case of FIG. 4A, Steps 709–726 for communication monitoring and controlling may be executed in parallel with the data transfer in Step 707 or interrupt the data transfer. The communication monitoring and controlling Steps 720S726 are no longer called once the data transfer in Steps 707 and 708 is finished.

The transmission power of the communication unit 12 may be controlled in accordance with the signal receiving condition or the received signal quality at the communication unit 42 of the digital camera 40.

In such case, prior to requesting picture data to be transmitted from the digital camera 40 in Step 707, the signal processing unit 11 requests the signal processing unit 41 of the digital camera 40 to supply the signal processing unit 11 with data relating to the RF signal receiving condition or received RF signal quality as detected at the communication unit 42 of the digital camera 40, in place of the device data of the digital camera 40. Such data may be a received signal power level or an error rate of the received data.

Figure 9D:
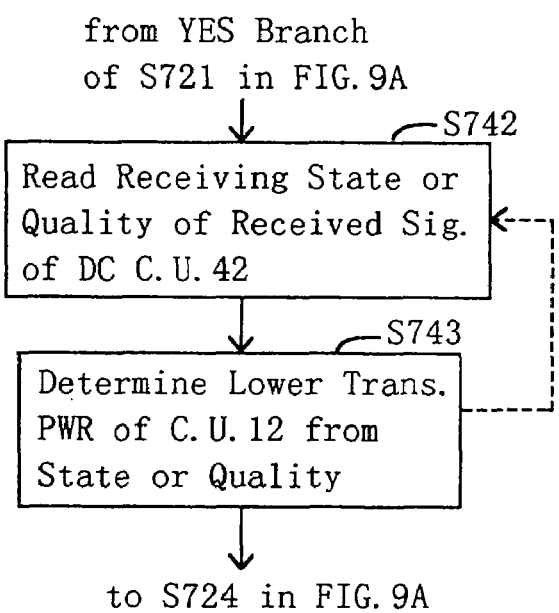

In response to such request, the signal processing unit 41 sends or feeds back the requested data via the communication unit 42 to the signal processing unit 11 of the personal computer 10 in Step 708. In this case, the procedure shown in FIG. 9D is employed in place of Steps 722 and 723. If the answer to the question in Step 721 is YES, so that the transmission power level is to be lowered, the signal processing unit 11 reads, in Step 742, the feedback power level of the signal received at the communication unit 42 of the digital camera 40. Then, in Step 743, the signal processing unit 11 calculates the distance d to the digital camera 40 based on the received signal power level at the communication unit 42 and the transmission power level of the communication unit 12, using the equation (2), and determines an optimum transmission power for the calculated distance d.

Alternatively, in Steps 742, the signal processing unit 11 may read the data error rate fed back from the communication unit 42, and calculates, in Step 743, an allowable amount by which the current transmission power of the communication unit 12 can be reduced, based on the data error rate and the allowable level for the error rate. Then, the transmission power of the communication unit 12 is lowered by the calculated amount.

Alternatively, the signal processing unit 11 may reduce the transmission power of the communication unit 12 stepwise in Step 743 when the data error rate read out in Step 742 is within the allowable range. When the data error rate increases above the allowable level, the transmission power level of the communication unit 12 is returned to the power level immediately before the error rate has exceeded the allowable level. In this case, therefore, Steps 742 and 743 may be repeated as indicated by a broken-line arrow in FIG. 9D.

The signal processing unit 11 may alternatively use, as a representation of the signal quality of the RF signal received by the communication unit 42 of the digital camera 40, the ACK/NAK ratio or the frequency of occurrence of data re-sending requests received from the communication unit 42 in Step 707.

Instead of analyzing the connection of the communication unit 14 to other device in Step 720 shown in FIG. 9A, the signal processing unit 11 may analyze the signal quality of the signal received by the communication unit 14, as shown in FIG. 9B. In this alternative, the signal processing unit 11 monitors the signal received by the communication unit 14 for its signal quality while Step 707 is being executed. The signal quality may be represented by, for example, a data error rate in the signal received by the unit 14 or an ACK/NAK ratio sent back from the unit 14. Then, as shown in FIG. 9B, in Step 730 following tep S709, the signal processing unit 11 detects whether the unit 14 is currently connected to some other device, If there is no connection to the unit 14, the procedure goes to Step 725. If it is known that the communication unit 14 is currently connected to some other device, it is judged whether or not the signal quality of the signal received by the communication unit 14 is above the allowable level. If the signal level is below the allowable one, the procedure goes to Step 721. If the signal quality is allowable, which means that the communication unit 14 is not subjected substantially no RF signal interference, the procedure proceeds to the Step 707.

The information processing device 20 shown in FIG. 3 and the information processing device 40 shown in FIG. 8 may have the transmission power levels of the respective communication units 22 and 42 controlled subsequent to the start of and in parallel with the data transfer in Step 308 (FIG. 4A), in a manner similar to the one described for the information processing device 10 with reference to FIGS. 4A–4C and FIGS. 9A–9D. After that, the procedure returns to Step 308.

Also, the signal processing unit 11 and the wireless LAN communication unit 14 of the information processing device 10, and the signal processing unit 51 and the wireless LAN communication unit 52 of the information processing device 50 shown in FIG. 8, may be arranged to operate in a similar manner to the ones described for the combination of the signal processing unit 11 and the communication unit 12 shown in FIGS. 3 and 8, the combination of the signal processing unit 21 and the communication unit 22 of the information processing device 20 shown in FIG. 3, and the combination of the signal processing unit 41 and the communication unit 42 of the information processing unit 40 shown in FIG. 8.

The communication units 12, 13, 14, 22, 42 and 52 shown in FIGS. 3 and 8 may be all Bluetooth wireless communication units. FIG. 10 shows an arrangement in which the communication units 12 and 15 of the first information processing device 10, the communication unit 22 of the second information processing device 20 and a communication unit 62 of the third information processing unit 60, which may be, for example, the printer 6 shown in FIG. 1, are all according to the Bluetooth Standard. These communication units are monitored and controlled for an optimum transmission power by the respective signal processing units 11, 21 and 61, to prevent RF signal interference.

One of the communication units 12 and 14 of the information processing device 10 shown in FIG. 8 may be a communication unit for wireless communication with a mobile station, e.g. the access point 30 shown in FIG. 3.

Figure 10:
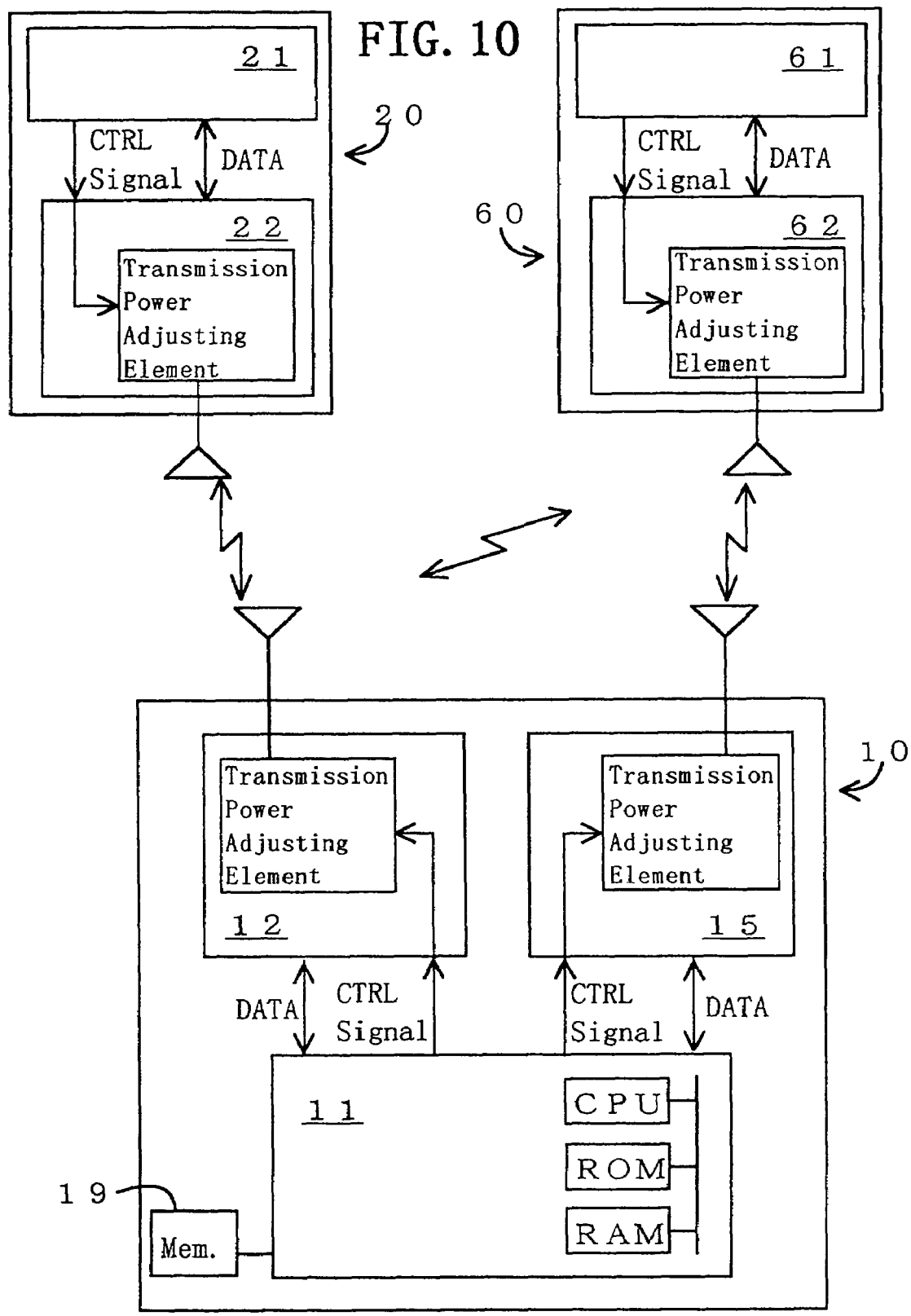
FIG. 10 is a block diagram of a system according to another embodiment of the present invention.

In FIG. 3, in place of the mobile communication unit 13, the wireless LAN communication unit 14 shown in FIG. 8 or the Bluetooth communication unit 15 shown in FIG. 10 may be monitored, in the same manner as the unit 13 is monitored, to control the Bluetooth communication unit 12. In FIG. 8, in place of the wireless LAN communication unit 14, the mobile communication unit 13 shown in FIG. 3 or the Bluetooth communication unit 15 shown in FIG. 10 may be monitored, in the same manner as the unit 14, to control the Bluetooth communication unit 12.

In addition to the short-distance wireless communication units 12, 15 and 22, the transmission condition or parameter of the communication unit 14 for communication with a wireless LAN may be monitored and controlled in a manner similar to the one for the communication unit 12.

The communication units which may be subject to RF interference and hence are to be monitored for its connection state have been described as ones which conform with any of the Bluetooth Standard, the LAN standard or the mobile communication network standard. The communication units which may tend to cause RF interference and are to be controlled have been described as ones which conform with any of the Bluetooth Standard or the LAN standard. However, only a communication unit subject to RF interference may be monitored, with the transmission power of a communication unit tending to cause RF interference only being controlled.

As various changes could be made in the above without departing from the scope of the invention, it is intended that all matter contained in the above description and shown in the accompanying drawings shall be interpreted as illustrative and not in a limiting sense.

What is claimed is:

1. An information processing device comprising therein a plurality of communication units each having a basedband unit and a wireless transceiver coupled to the baseband unit, and comprising therein a monitoring and controlling unit for monitoring and controlling said communication units, said monitoring and controlling unit being wired to said communication units, wherein said monitoring and controlling unit, when at least one of said plurality of communication units maintains a connection, iteratively monitors a communication state of at least another one of said plurality of communication units, and adjusts a communication condition of the wireless transceiver of said one communication unit in accordance with the communication state of the monitored other communication unit, so that an RF signal transmitted from the wireless transceiver of said one communication unit may not substantially interfere with the receipt of an RF signal by the wireless transceiver of said other communication unit.

2. The information processing device according to claim 1 wherein, when there is a connection request for connection to said other communication unit or when said other communication unit maintains a connection, said monitoring and controlling unit changes the transmission power level of said wireless transceiver of said one, connected communication unit to a lower level so that a RF signal transmitted from the wireless transceiver of said one communication unit may not substantially interfere with the reception of a RF signal by the wireless transceiver of said other communication unit.

3. The information processing device according to claim 1 wherein, when a signal quality of a RF signal received by the transceiver of said other communication unit is below an allowable level, said monitoring and controlling unit changes the transmission power level of said wireless transceiver of said one, connected communication unit to a lower level so that a RF signal transmitted from the wireless transceiver of said one communication unit may not substantially interfere with reception of a RF signal by the wireless transceiver of said other communication unit.

4. The information processing device according to claim 1 wherein said monitoring and controlling unit iteratively monitors a current state of said other communication unit relating to a connection thereof or a state of said other communication unit relating to a connection thereof expected to occur within a short time period.

5. The information processing device according to claim 1 wherein said monitoring and controlling unit iteratively monitors a signal quality of a RF signal received at the transceiver of said other communication unit.

6. The information processing device according to claim 1 wherein said monitoring and controlling unit, when adjusting the transmission condition of the wireless transceiver of said one, connected communication unit, causes another information processing device with which said information processing device is communicating through said one communication unit, to adjust a transmission condition of a wireless transceiver of a communication unit of said another information processing device, too.

7. The information processing device according to claim 1 wherein said monitoring and controlling unit further monitors reception power of a signal received by the transceiver of said one, connected communication unit, and the transmission condition of the transceiver of said one, connected communication unit is controlled also in accordance with the monitored reception power and with an application activated for data transfer via said one communication unit or device data of another information processing device with which said information processing device is communicating.

8. The information processing device according to claim 1 wherein said monitoring and controlling unit further monitors signal quality of a signal received by the transceiver of said one, connected communication unit, and the transmission condition of the wireless transceiver of said one, connected communication unit is controlled further in accordance with the monitored signal quality at said one communication unit.

9. The information processing device according to claim 1 wherein the transmission condition of the wireless transceiver of said one, connected communication unit is controlled also in accordance with a state of a RF signal received at a communication unit of another information processing device with which said one, connected communication unit is communicating.

10. The information processing device according to claim 1 wherein said plurality of communication units are formed in built-in or detachable modules.

11. The information processing device according to claim 1 wherein said plurality of communication units conform with at least one of the Bluetooth standard, the wireless LAN standard and the mobile communication network mobile station standard.

12. An information processing device comprising therein first and second communication units each having a baseband unit and a wireless transceiver coupled to said baseband unit, and comprising therein a monitoring and controlling unit for monitoring and controlling said first and second communication units said monitoring and controlling unit being wired to said communication units;

said monitoring and controlling unit iteratively monitoring communication states of said first and second communication units when said first communication unit maintains a connection, said monitoring and controlling unit adjusting a transmission condition of the wireless transceiver of said first communication unit in accordance with the monitored communication states of said first and second communication units, and with an application activated in relation to the connection of said first communication unit or device data of another information processing device with which said information processing device is communicating through said first communication unit, so that an RF signal transmitted by said first wireless transceiver of said first communication unit may not substantially interfere with reception of an RF signal by the wireless transceiver of said second communication unit.

13. The information processing device according to claim 12 wherein, when there is a connection request for connection to said second communication unit, or when said second communication unit maintains a connection, said monitoring and controlling unit lowers transmission power of the wireless transceiver of said first communication unit so that a RF signal transmitted by said first communication unit may not substantially interfere with reception of a RF signal by the wireless transceiver of said second communication unit.

14. The information processing device according to claim 12 wherein, when signal quality of a signal received at the wireless transceiver of said second communication unit is below an allowable level, said monitoring and controlling unit lowers transmission power of the wireless transceiver of said first communication unit so that a RF signal transmitted by said first communication unit may not substantially interfere with reception of a RF signal by the wireless transceiver of said second communication unit.

15. The information processing device according to claim 12 wherein said device data is sent on a RF signal from a wireless transceiver of a communication unit of said another information processing device to the wireless transceiver of said first communication unit, and is supplied to said monitoring and controlling unit from said first communication unit.

16. The information processing device according to claim 12 wherein, when said second communication unit maintains a connection, said monitoring and controlling unit iteratively monitors the communication states of said first and second communication units, and adjusts a transmission condition of the wireless transceiver of said second communication unit in accordance with the communication states of said first and second communication units, and with an application activated in relation to the connection of said second communication unit or device data of another information processing device.

17. The information processing device according to claim 12 wherein the communication state of said first communication unit to be monitored is at least one of transmission power of the wireless transceiver of said first communication unit and a signal state of a RF signal as received at the wireless transceiver of said first communication unit.

18. The information processing device according to claim 12 wherein the communication state of said first communication unit to be monitored is a signal state of a RF signal transmitted by the wireless transceiver of said first communication unit as received by a wireless transceiver of a communication unit of said another information processing device.

19. The information processing device according to claim 12 wherein said monitoring and controlling unit, when adjusting the transmission condition of the wireless transceiver of said first communication unit, causes said another information processing device to adjust a transmission condition of a wireless transceiver of a communication unit of said another information processing device, too.

20. The information processing device according to claim 12 wherein a RF signal transmitted by the wireless transceiver of said first communication unit tends to more strongly interfere with a RF signal reception of the transceiver of said second communication unit than a RF signal transmitted by the wireless transceiver of said second communication unit does with a RF signal reception of the transceiver of said first communication unit.

21. The information processing device according to claim 12 wherein said first and second communication units are formed in built-in modules or detachable modules.

22. The information processing device according to claim 12 wherein said first communication unit conforms with the Bluetooth standard or the wireless LAN standard, and said second communication unit conforms with the mobile communication network mobile unit standard, the wireless LAN standard or the Bluetooth standard.

23. An information processing device comprising therein at least one communication unit having a baseband unit and a wireless transceiver coupled to the baseband unit, and comprising therein a monitoring and controlling unit for monitoring and controlling said one communication unit, said monitoring and controlling unit being wired to said at least one communication unit, wherein, when said one communication unit establishes or maintains a connection, said monitoring and controlling unit adjusts a transmission condition of the wireless transceiver of said one communication unit in accordance with an application activated in relation to the connection of said one communication unit or device data of another information processing device with which said first information processing device is communicating through said one communication unit, so that an RF signal transmitted from the wireless transceiver of said one communication unit may not substantially interfere with the receipt of an RF signal by a wireless transceiver of a further communication unit of a further or said first information processing device.

24. The information processing device according to claim 23 wherein said monitoring and controlling unit, when adjusting the transmission condition of the wireless transceiver of said one communication unit, causes another information processing device to adjust a transmission condition of a wireless transceiver of a communication unit of said another information processing device, too.

25. An information processing device comprising therein at least one communication unit having a baseband unit and a wireless transceiver coupled to the baseband unit, and comprising therein a monitoring and controlling unit for monitoring and controlling said one communication unit, said monitoring and controlling unit being wired to said at least one communication unit, wherein, when said one communication unit maintains a connection, said monitoring and controlling unit iteratively monitors a communication state of said one communication unit, and adjusts a transmission condition of the wireless transceiver of said one communication unit in accordance with said monitored communication state, and with an application activated in relation to the connection of said one communication unit or device data of another information processing device with which said information processing device is communicating through said one communication unit, so that an RF signal transmitted from the wireless transceiver of said one communication unit may not substantially interfere with the receipt of an RF signal by a wireless transceiver of a further communication unit of a further or said first information processing device.

26. The information processing device according to claim 25 wherein the communication state of said one communication unit to be monitored is at least one of transmission power of the wireless transceiver of said one communication unit and a signal state of a RF signal as received at said wireless transceiver of said one communication unit.

27. The information processing device according to claim 25 wherein said monitoring and controlling unit, when adjusting the transmission condition of the wireless transceiver of said one communication unit, causes another information processing device to adjust a transmission condition of a wireless transceiver of a communication unit of said another information processing device, too.

28. The information processing device according to claim 25 wherein the communication state of said one communication unit to be monitored is a signal state of a RF signal transmitted from the wireless transceiver of said one communication unit as received at a wireless transceiver of a communication unit of said another information processing device.

29. The information processing device according to claim 25 wherein said device data is transmitted on a RF signal from a wireless transceiver of a communication unit of said another information processing device to the wireless transceiver of said one communication unit, and is supplied to said monitoring and controlling unit from said one communication unit.

30. The information processing device according to claim 25 wherein said communication unit conforms with the Bluetooth standard or the wireless LAN standard.

31. The information processing device according to claim 25 wherein said communication units are formed in built-in modules or detachable modules.

32. The information processing device according to claim 25 wherein said transmission condition is transmission power, a transmitter amplifier gain, an amount of attenuation provided by an attenuator, an antenna gain or an antenna direction.

33. A program stored in a recording medium for monitoring and controlling communications of an information processing device, said information processing device including therein a processor, and a plurality of communication units each having a baseband unit and a wireless transceiver coupled to the baseband unit, said processor being wired to said communication units, said program causing said processor to perform the steps of:
when at least one of said plurality of communication units maintains a connection, iteratively monitoring a communication state of at least another of said plurality of communication units; and
adjusting a transmission condition of the wireless transceiver of said one communication unit in accordance with the monitored communication state of said another communication unit, whereby an RF signal transmitted from the wireless transceiver of said one communication unit may not substantially interfere with the receipt of an RF signal by the wireless transceiver of said another communication unit.

34. The program according to claim 33 wherein said adjusting step includes a step of lowering transmission power of the wireless transceiver of said one, connected communication unit when there is a connection request for connection to said another communication unit or when said another communication unit maintains a connection, whereby a RF signal transmitted from the wireless transceiver of said one communication unit is substantially prevented from interfering with reception of a RF signal by the wireless transceiver of said another communication unit.

35. The program according to claim 33 wherein said adjusting step includes a step of lowering transmission power of the wireless transceiver of said one, connected communication unit, when a signal quality of a RF signal received by the transceiver of said another communication unit is below an allowable level, whereby a RF signal transmitted from the wireless transceiver of said one communication unit is substantially prevented from interfering with reception of a RF signal by the wireless transceiver of said another communication unit.

36. The program according to claim 33 wherein said monitoring step includes a step of iteratively monitoring a current state of said another communication unit relating to a connection thereof or a state of said another communication unit relating to a connection thereof predicted to occur within a short time period.

37. The program according to claim 33 wherein said monitoring step is a step of iteratively monitoring, signal quality of a signal received at the wireless transceiver of said another communication unit.

38. The program according to claim 33 wherein said program effecting said processor to perform a further step of:

causing another information processing device which is communicating with said information processing device through said one communication unit to adjust a transmission condition of a wireless transceiver of a communication unit of said another information processing device when a transmission condition of the wireless transceiver of said one communication unit is adjusted.

39. The program according to claim 33 wherein, in said adjusting step, the transmission condition of the transceiver of said one, connected communication unit is adjusted also in accordance with signal quality of a signal received at a transceiver of a communication unit of said another information processing device.

40. The program according to claim 33 wherein, in said monitoring step, reception power of a signal as received by the transceiver of said one, connected communication unit is further monitored, and, in said adjusting step, the transmission condition of the transceiver of said one, connected communication unit is controlled also in accordance with the monitored reception power and an application activated for data transfer via said one communication unit or device data of another information processing device with which said information processing device is communicating.

41. The program according to claim 33 wherein, in said monitoring step, signal quality of a signal received by the transceiver of said one, connected communication unit, and, in said adjusting step, the transmission condition of the wireless transceiver of said one, connected communication unit is controlled also in accordance with the monitored signal quality at said one communication unit.

42. A program stored in a recording medium for monitoring and controlling communications of an information processing device, said information processing device comprising therein a processor, and first and second communication units each having a baseband unit and a wireless transceiver coupled to the baseband unit, said processor being wired to said communication units, said program causing said processor to perform the steps of;
 iteratively monitoring communication states of said first and second communication units when said first communication unit maintains a connection; and
 adjusting a transmission condition of the wireless transceiver of said first communication unit in accordance with the monitored communication states of said first and second communication units, and with an application activated in relation to the connection of said first communication unit or device data of another information processing device with which said information processing device is communicating through said first communication unit, whereby an RF signal transmitted by said first wireless transceiver of said first communication unit may not substantially interfere with reception of an RF signal by the wireless transceiver of said second communication unit.

43. The program according to claim 42 wherein said adjusting step including a step of lowering transmission power of the wireless transceiver of said first communication unit, when there is a connection request for connection to said second communication unit, or when said second communication unit maintains a connection, whereby a RF signal transmitted by said first communication unit is substantially prevented from interfering with reception of a RF signal by the wireless transceiver of said second communication unit.

44. The program to claim 42 wherein, when signal quality of a signal received at the wireless transceiver of said second communication unit is below an allowable level, transmission power of the wireless transceiver of said first communication unit is lowered in said adjusting step to substantially prevent a RF signal transmitted by said first communication unit from interfering with reception of a RF signal by the wireless transceiver of said second communication unit.

45. The program according to claim 42 wherein said device data is sent on a RF signal from a wireless transceiver of a communication unit of said another information processing device to the wireless transceiver of said first communication unit, and is supplied to said processor from said first communication unit.

46. The program according to claim 42, said program causing said processor to perform a further step of:
 monitoring communication states of said first and second communication units iteratively when said second communication unit maintains a connection; and
 adjusting a transmission condition of the wireless transceiver of said second communication unit in accordance with the monitored communication states of said first and second communication units, and an application activated in relation to the connection of said second communication unit or device data of said another information processing device.

47. The program according to claim 42 wherein the communication state of said first communication unit to be monitored is at least one of transmission power of the wireless transceiver of said first communication unit and a signal state of a RF signal as received at the wireless transceiver of said first communication unit.

48. The program according to claim 42 wherein the communication state of said first communication unit to be monitored is a signal state of a RF signal transmitted by the wireless transceiver of said first communication unit as received by a wireless transceiver of a communication unit of said another information processing device.

49. The program according to claim 42 wherein said program causes said processor to perform a further step of causing said another information processing device to adjust a transmission condition of a wireless transceiver of a communication unit of said another information processing device, when the transmission condition of the wireless transceiver of said first communication unit is adjusted.

50. The program according to claim 42 wherein said first communication unit performs a communication procedure according to the Bluetooth protocol or wireless LAN protocol, and said second communication unit performs a communication procedure according to a mobile communication network protocol, a wireless LAN protocol or the Bluetooth protocol.

51. A program stored in a recording medium for monitoring and controlling communications of an information processing device, said information processing device including therein a processor, and at least one communication unit having a baseband unit and a wireless transceiver coupled to the baseband unit, said processor being wired to said at least one communication unit, said program causing said processor to perform the steps of:
 when said one communication unit establishes or maintains a connection, adjusting a transmission condition of the wireless transceiver of said one communication unit in accordance with an application activated in relation to the connection of said one communication unit, or device data of another information processing device with which said first information processing device is communicating through said one communication unit, whereby an RF signal transmitted by said first wireless transceiver of said first communication unit may not substantially interfere with reception of an RF signal by a wireless transceiver of a further communication unit of a further or said first information processing device.

52. The program according to claim 51 wherein said program causes said processor to perform a further step of causing said another information processing device to adjust a transmission state of a transceiver of a communication unit of said another information processing device when the transmission condition of the transceiver of said one communication unit is adjusted.

53. A program stored in a recording medium for monitoring and controlling communications of an information processing device, said information processing device comprising therein a processor, and at least one communication unit having a baseband unit and a wireless transceiver coupled to the baseband unit, said processor being wired to said at least one communication unit, said program causing said processor to perform the steps of:

iteratively monitoring a communication state of said one communication unit when said one communication unit maintains a connection; and adjusting a transmission condition of the wireless transceiver of said one communication unit in accordance with said monitored communication state and with an application activated in relation to the connection of said one communication unit or device data of another information processing device with which said first information processing device is communicating, whereby an RF signal transmitted by said first wireless transceiver of said first communication unit may not substantially interfere with reception of an RF signal by a wireless transceiver of a further communication unit of a further or said first information processing device.

54. The program according to claim 53 wherein the communication state of said one communication unit to be monitored is at least one of transmission power of the wireless transceiver of said one communication unit and a signal state of a RF signal as received at the wireless transceiver of said one communication unit.

55. The program according to claim 53 wherein said program causes said processor to perform a further step of causing said another information processing device to adjust a transmission state of a transceiver of a communication unit of said another information processing device when the transmission condition of the transceiver of said one communication unit is adjusted.

56. The program according to claim 53 wherein the communication state of said one communication unit to be monitored is a signal state of a RF signal transmitted from the wireless transceiver of said one communication unit as received at said another information processing device.

57. The program according to claim 53 wherein said device data is transmitted on a RF signal from a wireless transceiver of a communication unit of said another information processing device to the wireless transceiver of said one communication unit and is supplied to said processor from said one communication unit.

58. The program according to claim 53 wherein said one communication unit performs a communication procedure according to the Bluetooth protocol or a wireless LAN protocol.

59. The program according to claim 53 wherein said transmission condition to be adjusted is transmission power, a transmitter amplifier gain, an amount of attenuation provided by an attenuator, an antenna gain or an antenna direction.

* * * * *